(12) United States Patent
Boulet-Audet et al.

(10) Patent No.: US 12,213,496 B2
(45) Date of Patent: Feb. 4, 2025

(54) NON-ANIMAL-BASED WHOLE-CUT FOOD PRODUCTS

(71) Applicant: Impossible Foods Inc., Redwood City, CA (US)

(72) Inventors: Maxime Boulet-Audet, El Cerrito, CA (US); Elysia Cohn, San Mateo, CA (US); Carolyn Gresswell, Redwood City, CA (US); Dmitriy Khatayevich, Redwood City, CA (US); Xin Li, Fremont, CA (US); Behzad Nazari-Nasrabad, San Carlos, CA (US); Sowmya Purushothaman, Oakland, CA (US); Ines Resano Goizueta, Redwood City, CA (US); Sergey Solomatin, Los Altos, CA (US); Hui Wang, Redwood City, CA (US); Kelsie Wysong, San Mateo, CA (US)

(73) Assignee: Impossible Foods Inc., Redwood City, CA (US)

( * ) Notice: Subject to any disclaimer, the term of this patent is extended or adjusted under 35 U.S.C. 154(b) by 0 days.

(21) Appl. No.: 17/725,336

(22) Filed: Apr. 20, 2022

(65) Prior Publication Data
US 2022/0330575 A1    Oct. 20, 2022

Related U.S. Application Data

(60) Provisional application No. 63/177,153, filed on Apr. 20, 2021.

(51) Int. Cl.
*A23J 3/22*     (2006.01)
*A23J 3/16*     (2006.01)
*A23L 5/10*     (2016.01)

(52) U.S. Cl.
CPC .............. *A23J 3/227* (2013.01); *A23J 3/16* (2013.01); *A23L 5/10* (2016.08); *A23V 2002/00* (2013.01)

(58) Field of Classification Search
CPC ...... A23J 3/14; A23J 3/16; A23J 3/225; A23J 3/227; A23J 3/18; A23V 2250/51;
(Continued)

(56) References Cited

U.S. PATENT DOCUMENTS 2,952,542 A * 9/1960 Giddey ................... A23J 3/227
                                                              426/656
3,488,197 A * 1/1970 Page ....................... A23P 20/11
                                                              426/302
(Continued)

FOREIGN PATENT DOCUMENTS

GB      1588617 A  *  4/1981  .............. A23J 3/227

OTHER PUBLICATIONS

Sha et al., Plant protein-based alternatives of reconstructed meat: Science, technology, and challenges, Trends in Food Science & Technology, vol. 102, Jun. 8, 2020. Retrieved from the internet: <URL: https://www.sciencedirect.com/science/article/pii/S0924224420304830/>. pp. 51-61.
(Continued)

*Primary Examiner* — Drew E Becker
*Assistant Examiner* — Austin Parker Taylor
(74) *Attorney, Agent, or Firm* — Fish & Richardson P.C.

(57) ABSTRACT

Non-animal-based food products are described that simulate whole cuts of meat from an animal. In embodiments, the food products may include a group of aligned fibers, where the fibers have an average fiber diameter of less than or about 500 μm, and where the fibers comprise a non-animal-based protein. The food products may also include at least one binding agent in an interstitial space between at least a
(Continued)

portion of the group of aligned fibers. In additional embodiments, the food products may include a scaffolding having one or more membranes that have a three-dimensional porous structure, where the scaffolding comprises one or more non-animal-based proteins. These food products may also include a gelling agent filling one or more pores in the scaffolding, where the gelling agent includes water, at least one non-animal-based protein, and at least one non-animal-based polysaccharide.

25 Claims, 9 Drawing Sheets

(58) Field of Classification Search
CPC .... A23V 2250/5026; A23V 2250/5036; A23V 2250/5054; A23V 2250/5066; A23V 2250/507; A23V 2250/5072; A23V 2250/51088; A23P 10/00; A23P 10/20; A23L 11/00; A23L 11/05; A23L 19/00; A23L 19/09; A23L 19/12; A23L 29/20; A23L 29/206; A23L 29/231; A23L 29/256; A23L 29/272
USPC ........................................................ 426/574
See application file for complete search history.

(56) References Cited

U.S. PATENT DOCUMENTS

| | | | | |
|---|---|---|---|---|
| 3,627,536 | A * | 12/1971 | Arima et al. | D01F 4/00 530/367 |
| 3,886,299 | A * | 5/1975 | Feldbrugge | A23J 3/227 426/507 |
| 4,554,166 | A * | 11/1985 | Morimoto | A23J 3/28 426/802 |
| 2005/0112268 | A1* | 5/2005 | Kweldam | A23L 29/256 426/615 |
| 2014/0147555 | A1* | 5/2014 | Bilet | A23J 3/227 426/103 |
| 2015/0351427 | A1* | 12/2015 | Rose | A23L 13/426 426/574 |
| 2017/0188612 | A1* | 7/2017 | Varadan | A23L 13/43 |
| 2019/0037893 | A1 | 2/2019 | Ajami et al. | |
| 2019/0116855 | A1* | 4/2019 | Vrljic | C12C 5/026 |
| 2021/0051977 | A1 | 2/2021 | Vrljic et al. | |

OTHER PUBLICATIONS

International Search Report and Written Opinion for PCT/US2022/025620 mailed Jul. 20, 2022, all pages.

* cited by examiner

300

350

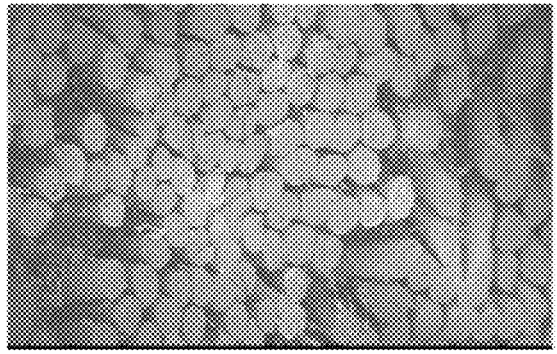
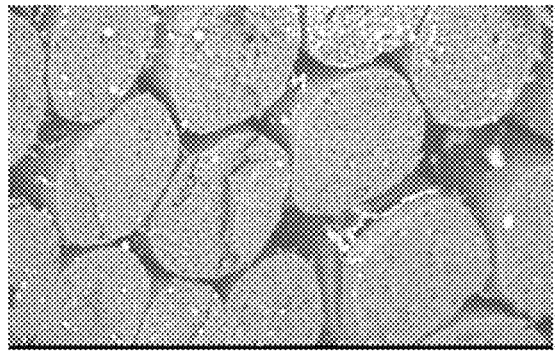
FIG. 8A  FIG. 8B
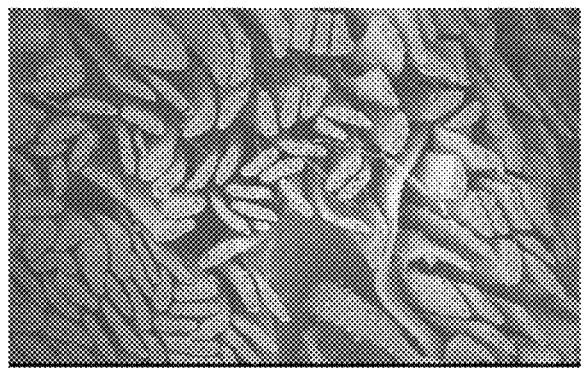
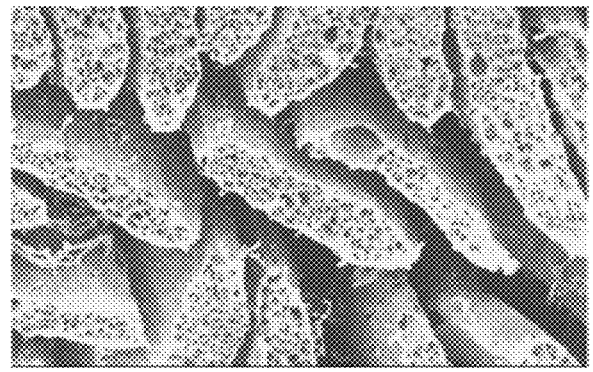
FIG. 9A  FIG. 9B
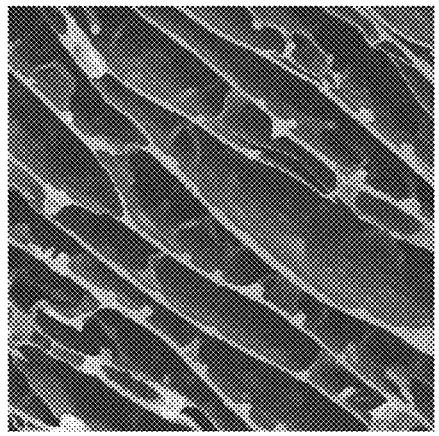
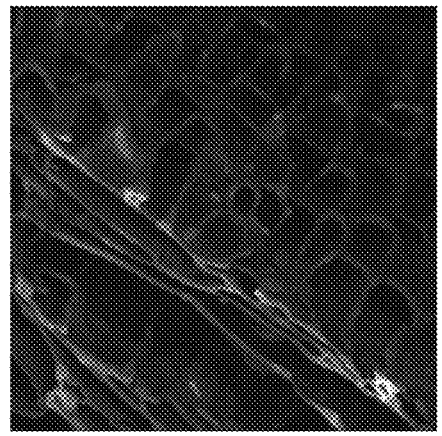
FIG. 10A  FIG. 10B

NON-ANIMAL-BASED WHOLE-CUT FOOD PRODUCTS

CROSS REFERENCES TO RELATED APPLICATIONS

This application is a nonprovisional of and claims the benefit of priority to U.S. Provisional Patent Application No. 63/177,153, filed Apr. 20, 2021, the entire content of which is incorporated herein by reference for all purposes.

TECHNICAL FIELD

The present technology relates to non-animal-based food products. More specifically, the present technology relates to non-animal-based food products that simulate whole cuts of meat from an animal.

BACKGROUND

As standards of living have improved around the world, there has been a corresponding increase in demand for animal-based food products such as beef, pork, lamb, poultry, fish, and shellfish, among other categories of animal-based foods. Unfortunately, this increase in demand for animal-based foods has created many environmental and ethical challenges. The challenges include increased pollution from animal waste and greenhouse gases, more annexation of farmland and green spaces to raise animals, overfishing of lakes and oceans, and overcrowded conditions for the animals, among others. These challenges have not reduced consumer demand, and further increased production of animal-based meat products seems inevitable without appealing non-animal-based substitutes.

Thus, there is a need for better non-animal-based food products that more closely simulate the experience of eating animal-based meat products. These and other needs are addressed by the present technologies.

SUMMARY

The present technologies include non-animal-based food products that simulate a whole cut of meat from an animal. The food products may include a group of aligned fibers that may have an average fiber diameter of less than or about 500 μm. The fibers may include at least one non-animal-based protein. The food products may also include at least one binding agent in an interstitial space between at least a portion of the group of aligned fibers.

In additional embodiments, the group of aligned fibers may be arranged in an orientation similar to myofibers in a muscle of an animal. In further embodiments, the food product may include an additional group of fibers that include at least one non-animal-based protein and at least one polysaccharide, where the additional group of fibers may be arranged in the food product to simulate connective tissue in a muscle of an animal. In still further embodiments, the polysaccharide may be selected from an alginate, konjac, gellan, carrageenan, locust bean gum, pectin, and an alkylcellulose. In yet additional embodiments, an additional group of structures that include at least one non-animal-based protein and at least one non-animal-based lipid, where the additional group of structures may be arranged in the food product to simulate adipose tissue in a muscle of an animal. In embodiments, the non-animal-based lipid may be selected from the group consisting of sunflower oil and coconut oil. In more embodiments, the non-animal-based protein in the fibers of the food product may be selected from soy protein, pea protein, potato protein, seitan protein, lentil protein, bean protein, amaranth protein, and *quinoa* protein. In still more embodiments, the food product may further include at least one iron-containing protein.

The present technology further includes additional embodiments of non-animal-based food products that simulate a whole cut of meat from an animal. These food products may include a scaffolding having one or more membranes that have a three-dimensional porous structure, where the scaffolding comprises one or more non-animal-based proteins. The food products may also include a gelling agent filling one or more pores in the scaffolding. The gelling agent may include water, at least one non-animal-based protein, and at least one non-animal-based polysaccharide. In further embodiments, the gelling agent may include water and at least one non-animal-based protein or at least one non-animal-based polysaccharide.

In additional embodiments, the scaffolding may include a first group of membranes aligned in a first direction and a second group of crosslinking membranes that connect with the first group of membranes. In further embodiments, the one or more non-animal-based proteins in the scaffolding may include at least one protein selected from soy protein, pea protein, potato protein, seitan protein, lentil protein, bean protein, amaranth protein, and *quinoa* protein. In still further embodiments, the at least one non-animal-based polysaccharide in the gelling agent may include at least one polysaccharide selected from an alginate, konjac, gellan, carrageenan, locust bean gum, pectin, and an alkylcellulose. In yet additional embodiments, the gelling agent may further include at least one additional compound selected from an enzymatic crosslinker, an emulsifier, an iron-containing protein, and a non-animal-based lipid. In more embodiments, the non-animal-based food product may simulate a whole cut of meat from an animal selected from beef, pork, lamb, chicken, fish, and shellfish.

The present technology also includes methods of making a cooked, non-animal-based food product that simulates a cooked whole cut of meat from an animal. The methods may include providing a raw food product to a cooking apparatus, where the raw food product includes one or more non-animal-based proteins that may be fibers or membrane scaffolding. The fibers or the membrane scaffolding may be characterized by a substantially aligned longitudinal direction. The methods may also include heating the raw food product with the cooking apparatus to make the cooked food product. The cooked food product may be characterized by a volume reduction of greater than or about 10 vol. % compared to the raw food product.

In additional embodiments, the raw food product may further include additional fibers or membranes that dissolve when the raw food product is heated to make the cooked food product. In further embodiments, the raw food product may be heated to an internal temperature greater than or about 145° F. to make the cooked food product. In still further embodiments, the cooked food product may be characterized by a chewiness that is greater than the chewiness of the raw food product. In yet additional embodiments, the cooked food product may be characterized by a shear force across the longitudinal direction of the fibers or the membrane scaffolding that is greater than or about twice a shear force along the longitudinal direction of the fibers or the membrane scaffolding. In more embodiments, the cooked, non-animal-based food product simulates a whole cut of meat from an animal selected from beef, pork, lamb, chicken, fish, and shellfish.

The present technology provides numerous benefits over traditional animal-based meat products and conventional vegetable substitutes for animal-based meat products. The present, non-animal-based food products simulate a whole cut of an animal meat without the environmental and ethical problems associated with farming and processing livestock, poultry, fish, or shellfish into animal-based meat products. For example, the non-animal-based proteins and other ingredients incorporated into the present food products may be made from agricultural crops grown by sustainable and ethical farming practices. In addition, the present technology provides non-animal-based food products that may be characterized by one or more organoleptic properties such as taste, flavor, aroma, odor, color, texture, chewiness, and mouthfeel, that are nearly identical to those qualities in whole cuts of animal-based meat products. These and other embodiments of the present technology, along with many of their advantages and features, are described in more detail in conjunction with the below description and attached figures.

BRIEF DESCRIPTION OF THE DRAWINGS

A further understanding of the nature and advantages of the disclosed technology may be realized by reference to the remaining portions of the specification and the drawings.

FIG. 8A shows an SEM image of a non-animal-based food product including round fibers according to embodiments.

FIG. 8B shows another SEM image of a non-animal-based food product including round fibers according to embodiments.

FIG. 9A shows an SEM image of a non-animal-based food product including ribbon-shaped fibers according to embodiments.

FIG. 9B shows another SEM image of a non-animal-based food product including ribbon-shaped fibers according to embodiments.

FIG. 10A shows an SEM image of a non-animal-based food product including food scaffolding according to embodiments.

FIG. 10B shows another SEM image of a non-animal-based food product including food scaffolding according to additional embodiments.

Figure 1:
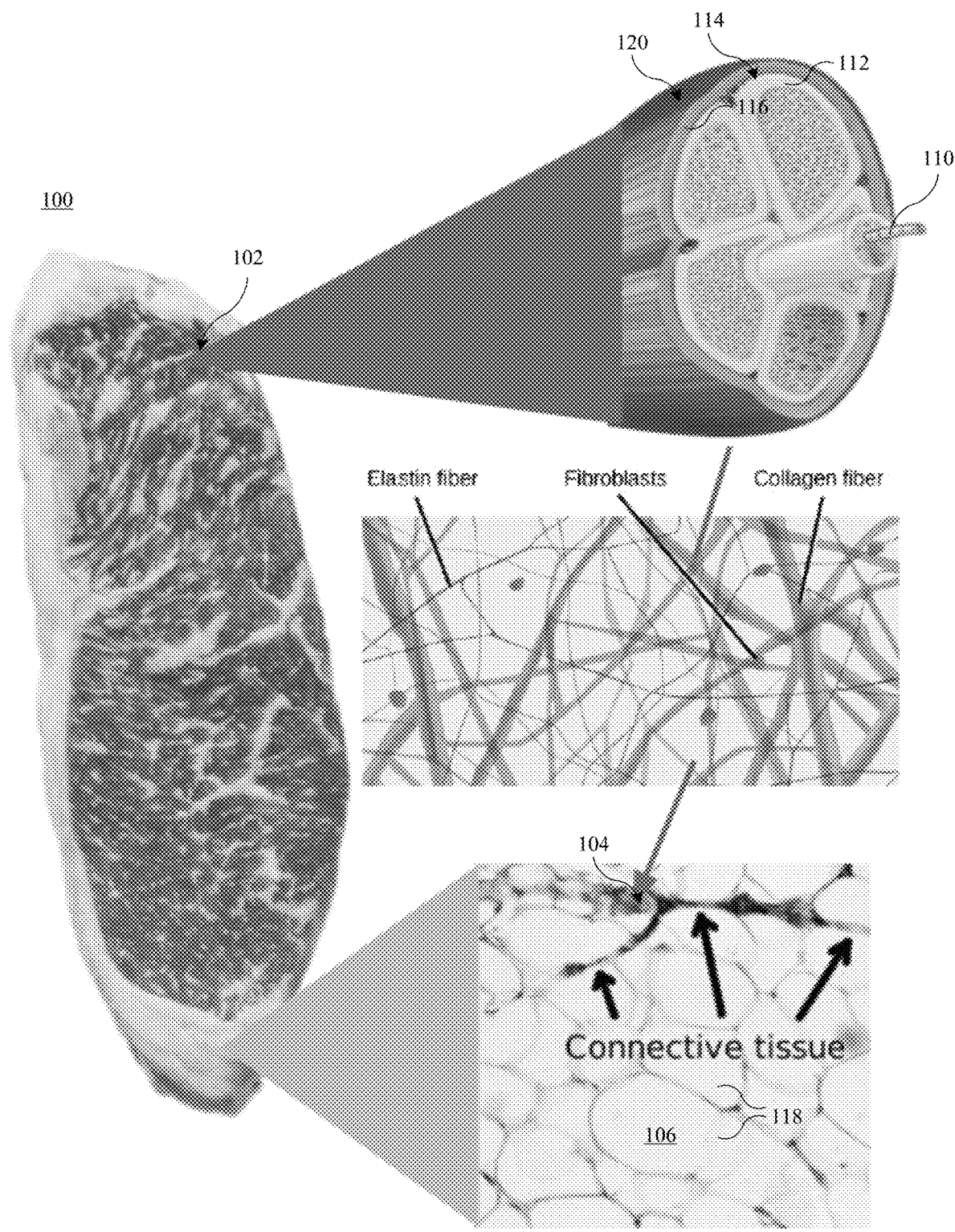
FIG. 1 shows a simplified schematic of an animal-based meat.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION

The present technology includes non-animal-based food products that simulate the organoleptic properties of whole cuts of meats from animals. Reproducing the organoleptic properties of whole cuts of animal meats has proven challenging with non-animal-based ingredients. In contrast to ground meats which normally have soft uniform textures, many whole cuts of meat have complex, non-uniform textures that are more difficult to reproduce in non-animal-based foods. For example, whole cuts of beef such as steak separate with a different shear force depending on whether the separation occurs in the direction of the grain of the muscle fibers in the steak. In another example, whole cuts of fish can flake apart when tensile force is applied in one direction while elastomerically stretching when the tensile force is applied in another direction.

Reproducing these grains of muscle fibers in non-animal-based foods is challenging for many reasons, including the challenge of simulating the size and arrangement of the muscle fibers in the non-animal-based materials. The muscle fibers of animals do not have the same size and arrangement of fibers that are found in most non-animals such as plants and fungi, so it is not possible to simulate animal meat by just making a non-animal-based food taste more like the animal meat. Moreover, the muscle fibers in animal meats are often integrated with additional kinds of tissue including connective and adipose tissue. Non-animal-based foods trying to simulate animal-based meats encounter additional challenges integrating the simulated muscle fibers with simulated versions of these additional tissues.

Additional challenges arise when cooking non-animal-based analogs to whole cuts of animal-based meats. The arrangement, size, and materials of muscle fibers and other types of tissue in whole cuts of animal based meats impart texture, chewiness, and mouthfeel characterized to the cooked meat that are difficult to reproduce in non-animal-based foods. For example, where many non-animal-based fruits and vegetables tend to soften and develop a mushy texture when cooked, many animal-based meats tend to toughen and develop an increased chewiness when cooked. Thus, developing a non-animal-based food that simulates a whole-cut of animal meat further requires that the nonanimal-based food reproduce the texture, chewiness, mouthfeel, and other organoleptic properties of the cooked food when being cooked.

The present technology addresses these and other challenges with non-animal-based foods trying to simulate whole cuts of animal-based meats. Embodiments of the present technology include non-animal-based food products that include one or more groups of fibers with sizes and alignments that simulate the muscle myofibers in animal-based meats. In further embodiments, the non-animal-based food products may include one or more additional types of fibers or other structures that simulate additional kinds of tissue in animal-based meats, such as connective and adipose tissue. The combination of the fibers with additional binding agents and taste ingredients simulate a whole cut, animal-based meat in the present, non-animal-based food products. Embodiments of the present technology also include non-animal-based food products that include a scaffolding of membranes made of non-animal-based ingredients that forms a three-dimensional porous structure which simulates the arrangement of muscle tissues in animal-based meat. The non-animal-based scaffolding may be infused with additional ingredients that together form a non-animal-based food product that simulates the organoleptic properties of a whole cut of an animal-based product.

The present technology also includes embodiments of methods of making a cooked, non-animal-based food product that simulates a cooked, whole cut of meat from an animal. These methods address consumer demand for non-animal-based food products that are characterized by cooking properties similar to the cooking properties of whole cut animal meats. This includes changes in the raw form of the non-animal-based food product being cooked that simulate the changes in an animal-based meat brought about by cooking. These and other features of the present non-animal-based food products that simulate whole cuts of animal-based meats are further described below with the aid of the figures.

FIG. 1 shows selected elements in a whole cut 100 of animal-based meat that embodiments of the present non-animal-based food products simulate. The whole cut 100 includes muscle fiber tissue 102, connective tissue 104 and adipose tissue 106, among other types of tissue. The muscle tissue may include skeletal muscle tissue that is characterized by individual muscle fibers called myofibers 110 that may be arranged in groups. The myofibers 110 may be characterized by an average cross-sectional diameter that may include ranges of greater than or about 20 µm, and less than or about 200 µm. The average length of the fibers may greatly exceed their diameter, and may include ranges of greater than or about 1 mm, or more. In the embodiment shown in whole cut 100, groups of myofibers 110 are arranged together in substantially parallel alignment and surrounded by a layer of perimysium connective tissue 112 to form a fascicle 114. The number of myofibers 110 in a fascicle 114 may be greater than or about 10, greater than or about 15, greater than or about 20, greater than or about 25, greater than or about 30, greater than or about 35, greater than or about 40, greater than or about 45, greater than or about 50, greater than or about 100, greater than or about 250, greater than or about 500, greater than or about 1000, greater than or about 1500, greater than or about 2000, greater than or about 5000, greater than or about 10000, greater than or about 15000, greater than or about 18000, greater than or about 20000, or more. The cross-sectional diameter of the fascicle 114 may be greater than or about 500 µm, greater than or about 1000 µm, greater than or about 2500 µm, greater than or about 5000 µm, greater than or about 7500 µm, greater than or about 10000 µm, or more. In the embodiment shown in whole cut 100, groups of fascicles like fascicle 114 may be further bundled together with another layer of connective tissue 116 to form a fascicle bundle 120. The number of fascicles bundled together may be greater than or about 2, greater than or about 3, greater than or about 4, greater than or about 5, greater than or about 10, greater than or about 25, greater than or about 50, greater that or about 100, greater than or about 250, greater than or about 500, greater than or about 750, greater than or about 1000, or more. In an embodiment, the muscle fiber tissue 102 may include about 70-80 wt. % water, about 15-25 wt. % protein, about 5-10 wt. % fat, about 0.5-5 wt. % carbohydrates, and about 0-5 wt. % of other ingredients. These other ingredients may include organic acids, sulfur compounds, nitrogenous compounds, such as amino acids and nucleotides, and inorganic substances such as minerals.

The whole cut 100 of an animal-based meat may further include connective tissue 104 that is integrated with the muscle fiber tissue 102. The connective tissue 104 may bundle and hold other tissues together, such as the myofibers 110 and fascicles 114 in whole cut 100. Examples of connective tissue include collagen fibers and elastin fibers, among other types of connective tissue fibers. These connective tissue fibers may be characterized by an average cross-sectional diameter that may include ranges of greater than or about 1 µm, and less than or about 20 µm. When animal meat is cooked, at least some of the connective tissue may hydrolyze to reconfigure the alignment of fibers in the cooked meat. In additional embodiments, individual fibers bridging tears can mimic the connective tissue while bundles of fibers can mimic the lean tissue.

The whole cut 100 of an animal-based meat may also include adipose tissue 106 that is integrated with the muscle fiber tissue 102. The adipose tissue 106 may include one or more adipocytes 118 that may be arranged into a structured reservoir of lipids by membranes of connective tissue 104. The individual adipocytes 118 may be characterized by an average diameter that may include ranges of greater than or about 20 µm, and less than or about 500 µm. When animal meat is cooked, at least some of the adipocytes 118 may liquefy and hydrolyze to release fats and oils into the cooked meat. In embodiments, the shrinkage, melting, or dissolving of the adipose tissue 106 and/or water loss through evaporation or leakage from the whole cut 100 may reduce the volume of the cooked meat compared to the starting raw meat. The volume shrinkage of the cooked whole cut 100 may be greater than or about 1 vol. %, greater than or about 5 vol. %, greater than or about 10 vol. %, greater than or about 15 vol. %, greater than or about 20 vol. %, or more.

Figure 2:
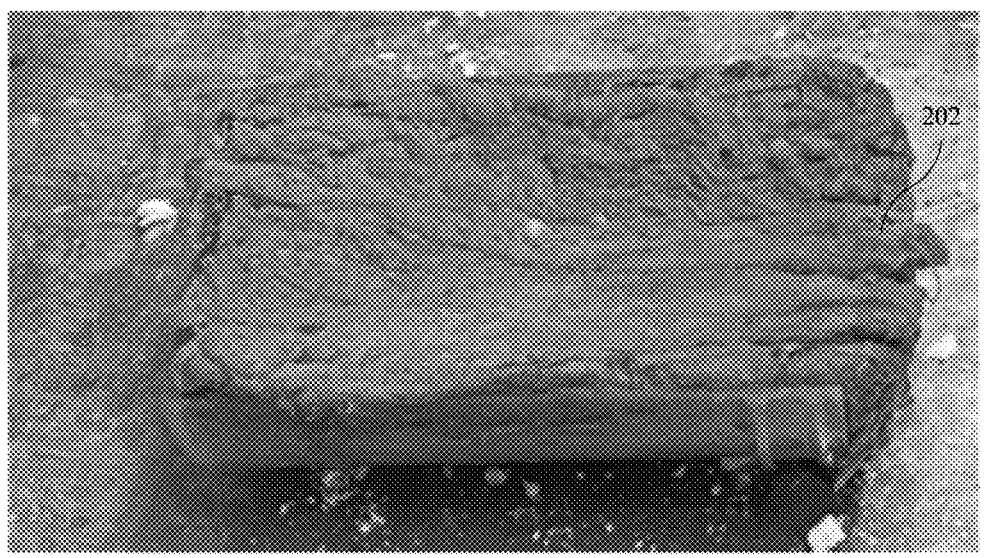
FIG. 2 shows a picture of a fiber-containing, non-animal-based food product according to embodiments.
Figure 3A:
FIG. 3A shows a picture of a scaffolding-containing, non-animal-based food product according to embodiments.
Figure 3B:
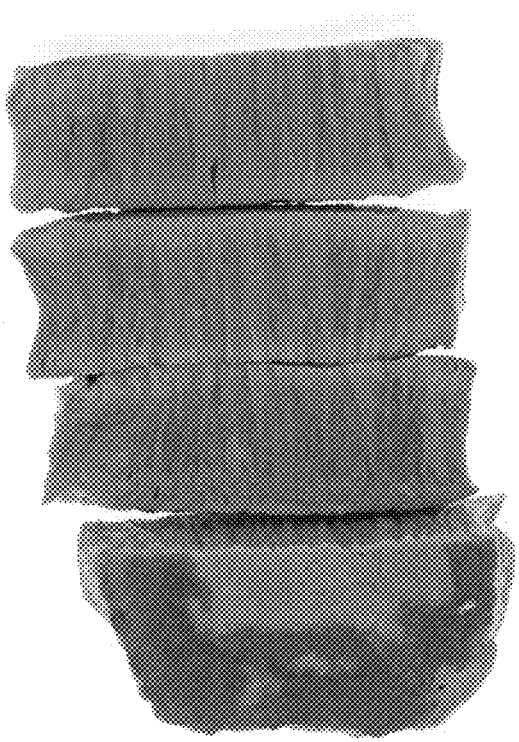
FIG. 3B shows a picture of a scaffolding-containing, non-animal-based food product according to additional embodiments.

FIGS. 2 and 3A-B show embodiments of non-animal-based food products that simulate whole cuts of animal-based meat like the ones described above in FIG. 1. In FIG. 2, the embodiment shown is for a non-animal-based food product 200 that includes fibers to simulate the structure of a whole cut of an animal-based meat. In FIGS. 3A-B, the embodiments shown are for non-animal-based food products 300 and 350 that use a membrane scaffolding and gelling agent to simulate the structure of a whole cut of an animal-based meat. In these embodiments and others, food-based ingredients simulate one or more of the muscle tissue, connective tissue, and fat tissue in a manner that approximates the organization of those tissues in an animal-based meat. In these embodiments and others, the non-animal-based food products simulate the organoleptic properties of whole cuts of an animal-based meat. In embodiments, these organoleptic properties of the non-animal-based food product may include one or more organoleptic qualities and characteristics such as appearance, shape, texture, aroma, odor, color, mouthfeel, density, richness, savoriness, saltiness, hardness, cohesiveness, brittleness, chewiness, springiness, gumminess, viscosity, elasticity, adhesiveness, softness, firmness, crumbliness, crunchiness, brittleness, tenderness, toughness, mealiness, pastiness, plasticity, elasticity, rubberiness, stickiness, tackiness, gooeyness, grittiness, graininess, coarseness, fibrousness, sinewiness, cellularness, crystallinity, dryness, moistness, wetness, wateriness, bloodiness, oiliness, fattiness, and greasiness, among other organoleptic properties.

FIG. 2 shows an embodiment of a non-animal-based food product 200 that simulates a whole cut of meat from an animal according to embodiments of the present technology. The non-animal-based food product 200 includes a group of aligned fibers 202 that extend from a first end of the product 200 to a second end that is opposite the first end. In embodiments, the aligned fibers of the non-animal-based food product may be characterized by an average length greater than or about 10 mm, greater than or about 20 mm, greater than or about 30 mm, greater than or about 40 mm, greater than or about 50 mm, greater than or about 60 mm, greater than or about 70 mm, greater than or about 80 mm, greater than or about 90 mm, greater than or about 100 mm, greater than or about 125 mm, greater than or about 150 mm, greater than or about 175 mm, greater than or about 200 mm, greater than or about 225 mm greater than or about 250 mm greater than or about 275 mm, greater than or about 300 mm, or more. In additional embodiments, the aligned fibers may include one or more continuous fibers that wrap around to form the non-animal-based food product. In embodiments, the one or more continuous fibers may be characterized by a fiber length of greater than or about 100 mm, greater than or about 250 mm, greater than or about 500 mm, greater than or about 750 mm, greater than or about 1000 mm, or more.

The aligned fibers 202 have an average fiber diameter of about 100 μm in the embodiment shown in FIG. 2. In additional embodiments, the aligned fibers may be characterized by an average diameter of greater than or about 20 μm, greater than or about 30 μm, greater than or about 40 μm, greater than or about 50 μm, greater than or about 60 μm, greater than or about 70 μm, greater than or about 80 μm, greater than or about 90 μm, greater than or about 100 μm, greater than or about 150 μm, greater than or about 200 μm, greater than or about 250 μm, greater than or about 300 μm, greater than or about 350 μm, greater than or about 400 μm, greater than or about 450 μm, or more. On the other hand, the aligned fibers may be characterized by an average fiber diameter that does not significantly exceed an average fiber diameter of a myofiber in the skeletal muscle of an animal. In further embodiments, the aligned fibers in the non-animal-based food product may be characterized by an average fiber diameter less than or about 500 μm, less than or about 400 μm, less than or about 300 μm, less than or about 200 μm, less than or about 175 μm, less than or about 150 μm, less than or about 140 μm, less than or about 130 μm, less than or about 120 μm, less than or about 110 μm, less than or about 100 μm, or less.

In embodiments, the individual fibers in the aligned fibers 202 may have an approximately uniform cross-sectional diameter or they may have a distribution of two or more diameters. In additional embodiments, the individual fibers may have a multi-modal distribution with a full-width-half-maximum (FWHM) that is greater than or about 1 μm, greater than or about 10 μm, greater than or about 50 μm, greater than or about 100 μm, greater than or about 250 μm, greater than or about 500 μm, greater than or about 1000 μm, greater than or about 2500 μm, greater than or about 5000 μm, greater than or about 7500 μm, greater than or about 10,000 μm, or more. In additional embodiments, a multi-modal distribution of cross-sectional fiber diameters may simulate the same size distribution of muscle fibers in an animal-based meat.

The aligned fibers 202 may include one or more non-animal-based proteins. In embodiments, the non-animal-based proteins may include one or more of soy protein, pea protein, potato protein, seitan protein, lentil protein, bean protein, amaranth protein, and *quinoa* protein. In additional embodiments, the non-animal-based proteins may include one or more proteins selected from ribosomal protein, translation elongation factors, hexokinase, glucose-6-phosphate isomerase, phosphofructokinase, fructose bisphosphate aldolase, triosephosphate isomerase, glyceraldehyde-3-phosphate dehydrogenase, phosphoglycerate kinase, phosphoglycerate mutase, enolase, pyruvate kinase, pyruvate decarboxylase, lactate dehydrogenase, ribulose-1,5-bisphosphate carboxylase oxygenase (rubisco), ribulose-1,5-bisphosphate carboxylate oxygenase activase (rubisco activase), other enzymes, actins, albumins, avenin, conglycinins, convicilins, cruciferin, dehydrin, extensins, gliadin, globulins, glutelin, gluten, glutenin, glycinins, glycoproteins, hordein, kafirin, legumin, napin, patatin, phaseolin, plant lipid transfer proteins, prolamins, proteinoplast, secalin, triticeae gluten, vicilins, zein, seed storage proteins, oleosins, caloleosins, steroleosins, other oil body proteins, vegetative storage protein A, vegetative storage protein B, and proteins from plants, seeds, algae, bacteria, or fungi. In further embodiments, the non-animal-based proteins may further include non-animal-based ingredients that are not removed during the extraction of the protein from a non-animal source (e.g., plants, seeds, algae, bacteria, or fungi). These additional ingredients may include starches, sugars, soluble or insoluble fiber, phytosteroids, sterols (e.g., phytosterols, ergosterol), carotenoids, chlorophyll, chloroplasts, nucleic acids, oils, fats, and celluloses, among other non-removed ingredients. In still further embodiments, the non-animal-based protein incorporated into the aligned fibers 202 may be characterized by a dry weight percentage protein that is greater than or about 15 wt. %, greater than or about 20 wt. %, greater than or about 25 wt. %, greater than or about 30 wt. %, greater than or about 35 wt. %, greater than or about 40 wt. %, greater than or about 50 wt. %, greater than or about 60 wt. %, greater than or about 65 wt. %, greater than or about 70 wt. %, greater than or about 75 wt. %, greater than or about 80 wt. %, greater than or about 85 wt. %, greater than or about 90 wt. %, greater than or about 95 wt. %, greater than or about 99 wt. %, or more.

In embodiments, the aligned fibers 202 may further include one or more polysaccharides. Examples of these polysaccharides include alginate, konjac, curdlan, gellan, carrageenan, locust bean gum, and pectin, among other polysaccharides. Additional examples include fecula, arrowroot, cornstarch, katakuri starch, potato starch, wheat starch, rice starch, modified food starch, maltodextrin, sago, tapioca, alginin, guar gum, xanthan gum, furcellaran, agar, cellulose, methylcellulose, hydroxymethylcellulose, acacia gum, dietary fiber (e.g., soluble fiber, insoluble fiber), and amylopectin, among other polysaccharides. In further embodiments, the aligned fibers 202 may include a weight percentage of the one or more polysaccharides that is less than or about 20 wt. %, less than or about 18 wt. %, less than or about 15 wt. %, less than or about 12 wt. %, less than or about 10 wt. %, less than or about 9 wt. %, less than or about 8 wt. %, less than or about 7 wt. %, less than or about 6 wt. %, less than or about 5 wt. %, less than or about 4 wt. %, less than or about 3 wt. %, less than or about 2 wt. %, less than or about 1 wt. %, or less.

In the embodiment shown in FIG. 2, the aligned fibers 202 have a solid round cross-sectional shape, where round shapes may include one or both of circular and oval cross-sectional shapes. In additional embodiments (not shown) the aligned fibers may have a triangular shape, a multilobal shape, a hollow shape, or a concave shape, among other cross-sectional shapes. In still additional embodiments, the aligned fibers may include two or more shapes of fibers to emphasize or blend of one or more organoleptic properties in the whole cut food product. The solid round shape of the aligned fibers 202 may be characterized by a reduced amount of friction between the fibers and less fraying and fracturing of the fibers that may be created as the fibers rub against each other. The whole cuts made from these aligned fibers 202 may be characterized by a greater retention of shape, texture, and other mechanical properties of the product. In embodiments that include multilobal-shaped fibers, the whole cut may be characterized by larger releases of juices when heated and compressed. In embodiments that include hollow-shaped fibers, the whole cuts may be characterized by increased release of juices when the fibers are sheared. In embodiments that include triangular-shaped fibers, whole cuts may be characterized by increased gloss and brighter color. In embodiments that include concave-shaped fibers, whole cuts may be characterized by an increased color depth and a reduction in the appearance of heterogeneities in the food product.

In embodiments, the aligned fibers may be grouped into larger, discrete fiber bundles. These fiber bundles may simulate the fascicles found in many types of fibrous muscle fiber tissue of many types of animal-based meats such as beef, pork, lamb, and chicken, among others. In further embodiments, the fiber bundles may be characterized by an average fiber number of individual fibers in the bundle greater than or about 5 fibers, greater than or about 10 fibers, greater than or about 15 fibers, greater than or about 20 fibers, greater than or about 25 fibers, greater than or about 30 fibers, greater than or about 40 fibers, greater than or about 50 fibers, greater than or about 100 fibers, greater than or about 200 fibers, greater than or about 300 fibers, greater than or about 400 fibers, greater than or about 500 fibers, greater than or about 1000 fibers, greater than or about 5000 fibers, greater than or about 10,000 fibers, greater than or about 15,000 fibers, or more. In still further embodiments, the fiber bundles may be characterized by an average cross-sectional diameter greater than or about 500 µm, greater than or about 1000 µm, greater than or about 2000 µm, greater than or about 3000 µm, greater than or about 4000 µm, greater than or about 5000 µm, greater than or about 6000 µm, greater than or about 7000 µm, greater than or about 8000 µm, greater than or about 9000 µm, greater than or about 10,000 µm, or more. The cross-sectional diameter of the fiber bundles can be used to manipulate the organoleptic properties of the food product. For example, an increased cross-sectional diameter of the fiber bundles may give the whole cut food product a larger grain size, and may also give the product an increased shear strength. A decreased cross-sectional diameter of the fiber bundles may give the food product more tenderness or homogeneous organoleptic properties.

In additional embodiments, the fiber bundles may be aligned in a single direction or may be aligned in two or more directions. In still further embodiments, the fiber bundles may have a multi-modal distribution of alignments that with a full-width-half-maximum (FWHM) that ranges from greater than or about 10°, greater than or about 20°, greater than or about 30°, greater than or about 40°, greater than or about 50°, greater than or about 60°, greater than or about 70°, greater than or about 80°, or more. In embodiments of whole cuts where the fiber bundles are approximately uniformly aligned, the anisotropy of the whole cut is high and gives the cut a clear cross-sectional appearance of the grains when they are sheared perpendicular to the long axis of the fiber bundles. In additional embodiments of whole cuts where there is a wide distribution in the alignments of the fiber bundles, the cut may take on the appearance of muscle fiber tissue in an animal-based meat.

The food product 200 may also include a binding agent that holds the aligned fibers 202 together and provide cross-grain interconnectivity. In embodiments, the binding agent matrix may occupy at least a portion of the interstitial space between the aligned fibers 202. In further embodiments, the binding agent may include one or more macronutrients such as a protein or a polysaccharide. In still further embodiments, the binding agent may include one or more enzymatic protein crosslinkers such as a transglutaminase enzyme, a lysyl oxidase enzyme, or an amine oxidase enzyme. In yet additional embodiments, the binding agent may include a gel, emulsion, aqueous colloid, film, web, partially-fused fiber, or suspension. In more embodiments, the binding agent may be applied to the aligned fibers 202 in a discontinuous manner (e.g., spot bonding). In still more embodiments, the binding agent may be applied to the aligned fibers 202 in a continuous manner. The amount of binding agent in the food product 200 may be less than or about 20 wt. %, less than or about 15 wt. %, less than or about 10 wt. %, less than or about 5 wt. %, less than or about 4 wt. %, less than or about 3 wt. %, less than or about 2 wt. %, less than or about 1 wt. %, or less.

In additional embodiments, the food product 200 may include one or more additional types of fibers that simulate additional kinds of tissue found in animal-based meats such as connective tissue and adipose tissue. Embodiments of additional fibers that simulate connective tissue may be made from a combination of protein and polysaccharide. In embodiments, the protein component of the fibers may include one or more non-animal-based proteins such as soy protein and pea protein, among other kinds of non-animal-based proteins. In further embodiments, the polysaccharide component of the fibers may include one or more non-animal-based polysaccharides such as an alginate, konjac, gellan, carrageenan, locust bean gum, pectin, and an alkylcellulose, among other non-animal-based polysaccharides. In still further embodiments, the alkylcellulose may include one or more alkylcelluloses such as methylcellulose, hydroxypropyl methylcellulose, and carboxymethyl cellulose, among other alkylcelluloses. In still further embodiments, the weight percentage of protein in the fibers may be greater than or about 75 wt. %, greater than or about 80 wt. %, greater than or about 85 wt. %, greater than or about 90 wt. %, greater than or about 95 wt. %, greater than or about 99 wt. %, or more. In yet additional embodiments, the weight percentage of polysaccharide in the fibers may be less than or about 20 wt. %, less than or about 15 wt. %, less than or about 10 wt. %, less than or about 5 wt. %, less than or about 2 wt. %, less than or about 1 wt. %, or less.

In embodiments, the additional fibers that simulate connective tissue may include one or more types of fibers that simulate collagen fibers and/or elastin fibers, among other types of connective tissue fibers found in animal-based meats. In further embodiments, the fibers simulating connective tissue may have an average cross-sectional fiber diameter of less than or about 100 µm, less than or about 50 µm, less than or about 40 µm, less than or about 30 µm, less than or about 20 µm, less than or about 15 µm, less than or about 10 µm, less than or about 5 µm, less than or about 4 µm, less than or about 3 µm, less than or about 2 µm, less than or about 1 µm, or less. In more embodiments, the fibers may be arranged in the food product 200 similar to an arrangement of connective tissue fibers in a whole cut of an animal-based meat.

In further embodiments, the food product 200 may include simulated connective tissue that envelops a group of the aligned fibers 200 into a fiber bundle. This simulated connective tissue simulates the perimysium tissue that envelops groups of myofibers to form fascicles in animal-based meats. Embodiments of the simulated perimysium connective tissue may include protein and polysaccharides like the above-described additional fibers that simulate other fiber-like forms of connective tissue in animal-based meats (e.g., collagen and elastin fibers). In additional embodiments, the simulated perimysium connective tissue may include one or more proteins from the prolamin family of proteins. In still further embodiments, the simulated perimysium connective tissue may include one or more of zein (found in corn), hordein (found in barley), gliadin (found in wheat), secalin (found in rye), kafirin (found in sorghum), and avenin (found in oats). In yet further embodiments, the simulated perimysium connective tissue may include one or more of storage proteins, animal-derived or recombinant collagen, and extensins (e.g., hydroxyproline-rich glycoproteins abundant in cell walls such as *Arabidopsis thaliana*).

In embodiments, the simulated perimysium connective tissue may have a hollow-tube-shape that holds the group of the aligned fibers 202 in a sheath-like fiber bundle. In more embodiments, the simulated perimysium connective tissue may have a wall thickness of less than or about 100 µm, less than or about 90 µm, less than or about 80 µm, less than or about 70 µm, less than or about 60 µm, less than or about 50 µm, less than or about 40 µm, less than or about 30 µm, less than or about 20 µm, less than or about 10 µm, less than or about 5 µm, less than or about 2 µm, less than or about 1 µm, or less. In yet more embodiments, the simulated perimysium connective tissue may have an inner diameter that holds the group of aligned fibers 202 that is greater than or about 500 µm, greater than or about 1000 µm, greater than or about 2000 µm, greater than or about 3000 µm, greater than or about 4000 µm, greater than or about 5000 µm, greater than or about 6000 µm, greater than or about 7000 µm, greater than or about 8000 µm, greater than or about 9000 µm, greater than or about 10,000 µm, or more. In still additional embodiments, the food product 200 may include simulated connective tissue that envelops a group of two or more of the fiber bundles into a larger fascicle bundle. In embodiments, this larger piece of simulated connective tissue may have a hollow-tube-shape that can hold two or more fiber bundles. In further embodiments, this large piece of sheath-like connective tissue may hold greater than or about two fiber bundles, greater than or about three fiber bundles, greater than or about five fiber bundles, greater than or about 7 fiber bundles, greater than or about ten fiber bundles, greater than or about 12 fiber bundles, greater than or about 15 fiber bundles, greater than or about 20 fiber bundles, or more.

In further embodiments, the food product 200 may include additional structures (e.g., fibers, globules, flecks, fat cap, etc.) that simulate adipose tissue in an animal-based meat. In embodiments, these structures may be made from a combination of protein and lipids (e.g., fats or oils). In embodiments, the protein component of the structures may include one or more non-animal-based proteins such as soy protein and pea protein, among other kinds of non-animal-based proteins. In further embodiments, the lipid component of the structures may include one or more non-animal-based lipids (e.g., plant-based oils) such as sunflower oil and coconut oil, among other non-animal-based lipids. In yet further embodiments the lipid component of the structures may include at least one non-animal-based lipid selected from avocado oil, babassu oil, canola oil, castor oil, corn oil, cottonseed oil, flaxseed oil, grape seed oil, hemp oil, olive oil, palm oil, palm kernel oil, peanut oil, pumpkin seed oil, rapeseed oil, rice bran oil, safflower oil, sesame oil, soybean oil, wheat germ oil, almond oil, beech nut oil, brazil nut oil, cashew oil, hazelnut oil, macadamia nut oil, pecan oil, pine nut oil, pistachio oil, walnut oil, cocoa butter, mango butter, shea butter, algal oil, oils produced by bacteria, algae, archaea or fungi or genetically engineered bacteria, algae, archaea or fungi, glycerophospholipids, glycolipids, glycosyl glycerides, lecithin, lysolecithin, phospholipids, phosphatidic acids, lysophosphatidic acids, sphingolipids, triglycerides, diglycerides, monoglycerides, free fatty acids, oleic acid, palmitoleic acid, palmitic acid, myristic acid, stearic acid, arachidic acid, lauric acid, myristoleic acid, caproic acid, capric acid, caprylic acid, pelargonic acid, undecanoic acid, linoleic acid, arachidonic acid, eicosapentaenoic acid, docosahexaenoic acid, 18:2 conjugated linoleic acid, conjugated oleic acid, or esters of: oleic acid, palmitoleic acid, palmitic acid, myristic acid, stearic acid, arachidic acid, lauric acid, myristoleic acid, caproic acid, capric acid, caprylic acid, pelargonic acid, undecanoic acid, linoleic acid, arachidonic acid, eicosapentaenoic acid, docosahexaenoic acid, 18:2 conjugated linoleic acid, or conjugated oleic acid, or glycerol esters of oleic acid, palmitoleic acid, palmitic acid, myristic acid, stearic acid, arachidic acid, lauric acid, myristoleic acid, caproic acid, capric acid, caprylic acid, pelargonic acid, undecanoic acid, linoleic acid, arachidonic acid, eicosapentaenoic acid, docosahexaenoic acid, 18:2 conjugated linoleic acid, or conjugated oleic acid, or diglyceride derivatives of oleic acid, palmitoleic acid, palmitic acid, myristic acid, stearic acid, arachidic acid, lauric acid, myristoleic acid, caproic acid, capric acid, caprylic acid, pelargonic acid, undecanoic acid, linoleic acid, arachidonic acid, eicosapentaenoic acid, docosahexaenoic acid, 18:2 conjugated linoleic acid, and conjugated oleic acid, or triglyceride derivatives of oleic acid, palmitoleic acid, palmitic acid, myristic acid, stearic acid, arachidic acid, lauric acid, myristoleic acid, caproic acid, capric acid, caprylic acid, pelargonic acid, undecanoic acid, linoleic acid, arachidonic acid, eicosapentaenoic acid, docosahexaenoic acid, 18:2 conjugated linoleic acid, and conjugated oleic acid. In still further embodiments, the weight percentage of lipids in the structures may be greater than or about 75 wt. %, greater than or about 80 wt. %, greater than or about 85 wt. %, greater than or about 90 wt. %, greater than or about 95 wt. %, or more. In yet additional embodiments, the weight percentage of protein in the structures may be less than or about 20 wt. %, less than or about 15 wt. %, less than or about 10 wt. %, less than or about 5 wt. %, less than or about 2 wt. %, less than or about 1 wt. %, or less.

In embodiments, the additional structures that simulate adipose tissue may include one or more globules that simulate fat globules found in animal-based meats. In further embodiments, the one or more globules may have an average cross-sectional diameter at their widest point of greater than or about 50 µm, greater than or about 75 µm, greater than or about 100 µm, greater than or about 125 µm, greater than or about 150 µm, greater than or about 175 µm, greater than or about 200 µm, or more. In more embodiments, the structures may be arranged in the food product 200 similar to an arrangement of intramuscular fat globules in a whole cut of an animal-based meat.

In further embodiments, the additional structures that simulate adipose tissue may have a non-uniform distribution in the food product 200 to simulate the differences in distributions of fat globules in intramuscular, intermuscular, and subcutaneous regions of animal-based meats. In embodiments, the intermuscular or subcutaneous regions may simulate regions of concentrated fat tissue that surround one or more pieces of muscle tissue in a whole cut of an animal-based meat. The additional structures in the regions of the food product 200 that simulate concentrated adipose tissue in intermuscular or subcutaneous regions of animal-based meats may have a weight percentage of the region that is greater than or about 10 wt. %, greater than or about 20 wt. %, greater than or about 30 wt. %, greater than or about 40 wt. %, greater than or about 50 wt. %, greater than or about 60 wt. %, greater than or about 70 wt. %, or more. The remaining components of these regions in the food product 200 that simulate intermuscular regions may include simulated muscle tissue (e.g., aligned fiber 202) and simulated connective tissue (e.g., additional branching fibers that simulate connective tissue). In further embodiments, food product 200 may also include regions that contain the additional adipose structures which simulate intramuscular regions of an animal-based meat. These simulated intramuscular regions of the food product 200 may be characterized by lower weight percentages of the adipose structures than found in the simulated intermuscular regions. In embodiments, the simulated intramuscular regions of the food product 200 may be characterized by weight percentages of the additional adipose structures that are less than or about 20 wt. %, less than or about 15 wt. %, less than or about 10 wt. %, less than or about 9 wt. %, less than or about 8 wt. %, less than or about 7 wt. %, less than or about 6 wt. %, less than or about 5 wt. %, less than or about 4 wt. %, less than or about 3 wt. %, less than or about 2 wt. %, less than or about 1 wt. %, or less. In still further embodiments, the additional adipose structures may be uniformly or non-uniformly distributed in the regions of food product 200 simulating intramuscular regions. In yet additional embodiments, a non-uniform distribution of the additional adipose structures may simulate fat marbling or fat caps in an animal-based meat.

In embodiments, the food product 200 may include weight percentages of aligned fibers 202, additional fibers and structures that that simulate connective tissue, and additional structures that simulate adipose tissue that simulate the weight percentages of muscle, connective, and adipose tissues in types of animal-based meats. In embodiments of food product 200 that simulate lean beef, the weight percentage of the aligned fibers 202 simulating muscle tissue may be greater than or about 80 wt. %, greater than or about 85 wt. %, greater than or about 90 wt. %, greater than or about 95 wt. %, or more. Also in these embodiments, the weight percentage of additional structures that simulate adipose tissue may be less than or about 20 wt. %, less than or about 15 wt. %, less than or about 10 wt. % less than or about 5 wt. %, less than or about 2 wt. %, or less.

FIGS. 3A-B show additional embodiments of a non-animal-based food products 300 and 350. In these embodiments, the food products 300 and 350 include a scaffolding that has one or more three-dimensionally-aligned membranes or columns that give the scaffolding a porous structure. In embodiments, the scaffolding simulates lean tissue (e.g., muscle tissue) or connective tissue in an animal-based meat. In further embodiments, the scaffolding may include a first group of membranes characterized by uniaxial alignment in a first direction and a second group of membranes aligned in one or more directions that are different than the alignment of the first group of membranes. In additional embodiments, the scaffolding may include a group of membranes in a biaxial alignment that may be cross-linked together. In embodiments, a first portion of the group of membranes are aligned in one direction and a second portion of the group of membranes are aligned in a second, cross-linking direction that is different from the first direction resulting in a cellular structure. In further embodiments the two portions of the biaxially-aligned group of membranes may be aligned substantially perpendicular to each other. In yet further embodiments, the membranes in the scaffolding may have a thickness of less than or about 1000 µm, less than or about 750 µm, less than or about 500 µm, less than or about 250 µm, less than or about 100 µm, less than or about 75 µm, less than or about 50 µm, less than or about 25 µm, less than or about 10 µm, or less. In still further embodiments, the membranes in the scaffolding may have a length of greater than or about 50 µm, greater than or about 100 µm, greater than or about 150 µm, greater than or about 200 µm, greater than or about 250 µm, greater than or about 500 µm, greater than or about 750 µm, greater than or about 1000 µm, or greater.

In additional embodiments, the membranes in the scaffolding may include one or more non-animal-based proteins such as soy protein, pea protein, potato protein, seitan protein, lentil protein, bean protein, amaranth protein, and *quinoa* protein, among other kinds of non-animal-based proteins. In additional embodiments, the non-animal-based proteins may include one or more proteins selected from ribosomal protein, translation elongation factors, hexokinase, glucose-6-phosphate isomerase, phosphofructokinase, fructose bisphosphate aldolase, triosephosphate isomerase, glyceraldehyde-3-phosphate dehydrogenase, phosphoglycerate kinase, phosphoglycerate mutase, enolase, pyruvate kinase, pyruvate decarboxylase, lactate dehydrogenase, ribulose-1,5-bisphosphate carboxylase oxygenase (rubisco), ribulose-1,5-bisphosphate carboxylase oxygenase activase (rubisco activase), other enzymes, actins, albumins, avenin, conglycinins, convicilins, cruciferin, dehydrin, extensins, gliadin, globulins, glutelin, gluten, glutenin, glycinins, glycoproteins, hordein, kafirin, legumin, napin, patatin, phaseolin, plant lipid transfer proteins, prolamins, proteinoplast, secalin, triticeae gluten, vicilins, zein, seed storage proteins, oleosins, caloleosins, steroleosins, other oil body proteins, vegetative storage protein A, vegetative storage protein B, and proteins from plants, seeds, algae, bacteria, or fungi. In further embodiments, the weight percentage of protein in the membranes of the scaffolding may be greater than or about 10 wt. %, greater than or about 20 wt. %, greater than or about 30 wt. %, greater than or about 40 wt. %, greater than or about 50 wt. %, greater than or about 60 wt. %, greater than or about 70 wt. %, greater than or about 80 wt. %, greater than or about 90 wt. %, or more.

In still further embodiments, the membranes in the scaffolding may include one or more non-animal-based polysaccharides such as alginate, konjac, gellan, carrageenan, locust bean gum, pectin, and alkylcellulose (e.g., methylcellulose, hydroxypropyl methylcellulose, carboxymethyl cellulose, etc.), among other non-animal-based polysaccharides. In further embodiments, the weight percentage of polysaccharides in the membranes of the scaffolding may be less than or about 70 wt. %, less than or about 60 wt. %, less than or about 50 wt. %, less than or about 40 wt. %, less than or about 30 wt. %, less than or about 20 wt. %, less than or about 10 wt. %, or less.

In further embodiments, the scaffolding-containing, non-animal-based food product 300 may further include a gelling agent that fills at least some of the pores in the scaffolding. In additional embodiments, the gelling agent may include water, at least one non-animal-based protein, and least one non-animal-based polysaccharide. In further embodiments, the at least one non-animal-based protein may include one or more proteins selected from soy protein, pea protein, potato protein, seitan protein, lentil protein, bean protein, amaranth protein, and *quinoa* protein, among other non-animal-based proteins. In additional embodiments, the protein in the gelling agent may have a weight percentage of less than or about 50 wt. %, less than or about 40 wt. %, less than or about 30 wt. %, less than or about 20 wt. %, less than or about 10 wt. %, or less. In still further embodiments, the at least one non-animal-based polysaccharide may include at least one polysaccharide selected from an alginate, konjac, curdlan, gellan, carrageenan, locust bean gum, pectin, and alkylcellulose (e.g., methylcellulose, hydroxypropyl methylcellulose, carboxymethyl cellulose, etc.), among other non-animal-based polysaccharides. Additional examples include fecula, arrowroot, cornstarch, katakuri starch, potato starch, wheat starch, rice starch, modified food starch, maltodextrin, sago, tapioca, alginin, guar gum, xanthan gum, furcellaran, agar, cellulose, methylcellulose, hydroxymethylcellulose, acacia gum, dietary fiber (e.g., soluble fiber, insoluble fiber), and amylopectin, among other polysaccharides. In additional embodiments, the polysaccharide in the gelling agent may have a weight percentage of less than or about 50 wt. %, less than or about 40 wt. %, less than or about 30 wt. %, less than or about 20 wt. %, less than or about 10 wt. %, or less. In more embodiments, the gelling agent may further include at least one non-animal-based lipid. In embodiments, the non-animal-based lipid may include a non-animal-based lipid selected from sunflower oil and coconut oil, among other non-animal-based lipids. In further embodiments, the non-animal-based lipid may be selected from avocado oil, babassu oil, canola oil, castor oil, corn oil, cottonseed oil, flaxseed oil, grape seed oil, hemp oil, olive oil, palm oil, palm kernel oil, peanut oil, pumpkin seed oil, rapeseed oil, rice bran oil, safflower oil, sesame oil, soybean oil, wheat germ oil, almond oil, beech nut oil, brazil nut oil, cashew oil, hazelnut oil, macadamia nut oil, pecan oil, pine nut oil, pistachio oil, walnut oil, cocoa butter, mango butter, shea butter, algal oil, oils produced by bacteria, algae, archaea or fungi or genetically engineered bacteria, algae, archaea or fungi, glycerophospholipids, glycolipids, glycosyl glycerides, lecithin, lysolecithin, phospholipids, phosphatidic acids, lysophosphatidic acids, sphingolipids, triglycerides, diglycerides, monoglycerides, free fatty acids, oleic acid, palmitoleic acid, palmitic acid, myristic acid, stearic acid, arachidic acid, lauric acid, myristoleic acid, caproic acid, capric acid, caprylic acid, pelargonic acid, undecanoic acid, linoleic acid, arachidonic acid, eicosapentaenoic acid, docosahexaenoic acid, 18:2 conjugated linoleic acid, conjugated oleic acid, or esters of: oleic acid, palmitoleic acid, palmitic acid, myristic acid, stearic acid, arachidic acid, lauric acid, myristoleic acid, caproic acid, capric acid, caprylic acid, pelargonic acid, undecanoic acid, linoleic acid, arachidonic acid, eicosapentaenoic acid, docosahexaenoic acid, 18:2 conjugated linoleic acid, or conjugated oleic acid, or glycerol esters of oleic acid, palmitoleic acid, palmitic acid, myristic acid, stearic acid, arachidic acid, lauric acid, myristoleic acid, caproic acid, capric acid, caprylic acid, pelargonic acid, undecanoic acid, linoleic acid, arachidonic acid, eicosapentaenoic acid, docosahexaenoic acid, 18:2 conjugated linoleic acid, or conjugated oleic acid, or diglyceride derivatives of oleic acid, palmitoleic acid, palmitic acid, myristic acid, stearic acid, arachidic acid, lauric acid, myristoleic acid, caproic acid, capric acid, caprylic acid, pelargonic acid, undecanoic acid, linoleic acid, arachidonic acid, eicosapentaenoic acid, docosahexaenoic acid, 18:2 conjugated linoleic acid, and conjugated oleic acid, or triglyceride derivatives of oleic acid, palmitoleic acid, palmitic acid, myristic acid, stearic acid, arachidic acid, lauric acid, myristoleic acid, caproic acid, capric acid, caprylic acid, pelargonic acid, undecanoic acid, linoleic acid, arachidonic acid, eicosapentaenoic acid, docosahexaenoic acid, 18:2 conjugated linoleic acid, and conjugated oleic acid. In additional embodiments, the lipid in the gelling agent may have a weight percentage of less than or about 40 wt. %, less than or about 30 wt. %, less than or about 20 wt. %, less than or about 10 wt. %, less than or about 5 wt. %, or less.

In still further embodiments, the gelling agent may include one or more additional ingredients such as an enzymatic crosslinker and an emulsifier. In embodiments, the enzymatic crosslinker may include one or more of a transglutaminase enzyme, lysyl oxidase enzyme, and an amine oxidase enzyme. In more embodiments, the enzymatic crosslinker in the gelling agent may have a weight percentage of less than or about 2 wt. %. In still more embodiments, the emulsifier may include one or more emulsifiers selected from proteins, monoglycerides, diglycerides, and polysorbates (e.g., Polysorbate 20). In yet further embodiments, the emulsifier in the gelling agent may have a weight percentage of less than or about 5 wt. %, less than or about 4 wt. %, less than or about 3 wt. %, less than or about 2 wt. %, less than or about 1 wt. %, or less.

In yet additional embodiments, the gelling agent may include one or more thickening agents. In embodiments, the thickening agent may include one or more of fecula, arrowroot, cornstarch, katakuri starch, potato starch, wheat starch, rice starch, modified food starch, maltodextrin, sago, tapioca, alginin, guar gum, locust bean gum, xanthan gum, collagen, egg whites, furcellaran, gelatin, agar, carrageenan, cellulose, methylcellulose, hydroxypropyl methylcellulose, carboxymethyl cellulose, acacia gum, konjac, starch, pectin, amylopectin or proteins derived from legumes, grains, nuts, other seeds, leaves, algae, bacteria, of fungi can be used alone or in combination to thicken the gelling agent. In further embodiments, the thickening agents in the gelling agent may have a weight percentage of less than or about 25 wt. %, less than or about 20 wt. %, less than or about 15 wt. %, less than or about 10 wt. %, less than or about 5 wt. %, or less.

In embodiments, the gelling agent may undergo a viscosity increase after filling at least a portion of the pores in the scaffolding. In further embodiments, the gelling agent supplied to the scaffolding may be characterized by a room temperature (e.g., 23° C.) viscosity of less than or about 1000 cP, less than or about 500 cP, less than or about 250 cP, less than or about 100 cP, less than or about 50 cP, less than or about 25 cP, less than or about 10 cP, less than or about 5 cP, less than or about 1 cP, or less. In yet further embodiments, the gelling agent in a fully-viscosified state may have a room temperature viscosity of greater than or about 10,000 cP, greater than or about 25,000 cP, greater than or about 50,000 cP, greater than or about 100,000 cP, greater than or about 250,000 cP, greater than or about 500,000 cP, greater than or about 1,000,000 cP, or more.

In additional embodiments of food product 300, the scaffolding in the food product may have a weight percentage of less than or about 80 wt. %, less than or about 70 wt. %, less than or about 60 wt. %, less than or about 50 wt. %, less than or about 40 wt. %, less than or about 30 wt. %, less than or about 20 wt. %, or less. In still further embodiments, the gelling agent in the food product 300 may have a weight percentage of greater than or about 20 wt. %, greater than or about 30 wt. %, greater than or about 40 wt. %, greater than or about 50 wt. %, greater than or about 60 wt. %, greater than or about 70 wt. %, greater than or about 80 wt. %, greater than or about 90 wt. %, or more.

In embodiments of the present technology, the above-described non-animal-based food products may simulate animal-based meats from beef (cattle), pork (pig), lamb (sheep), poultry (e.g., chicken, duck, turkey, goose, quail, guinea fowl, squab), fish, and shellfish. In additional embodiments, the present non-animal-based food products may simulate animal-based meats from one or more kinds of farmed or domesticated animal. In still further embodiments the non-animal-based food products may simulate meat from game animals (whether wild or farmed) such as rabbit, deer, bison, buffalo, boar, snake, pheasant, quail, bear, elk, antelope, pigeon, dove, grouse, fox, wild pig, goat, kangaroo, emu, alligator, crocodile, turtle, groundhog, marmot, possum, partridge, squirrel, raccoon, whale, seal, ostrich, guinea pig, rodent, and vole, among other kinds of game animals. In more embodiments, the non-animal-based food products may simulate meats from seafood such as fish (e.g., whitefish, oily fish, bony fish), crustaceans (e.g., crab, lobster, crayfish, shrimp, prawns), molluscs (e.g., clam, oyster, mussel, scallop, abalone), cephalopods (e.g., squid, octopus, cuttlefish), sea urchin, tunicate, jellyfish, and eel, among other kinds of seafood. In yet more embodiments, the non-animal-based food products may simulate meat from an insect or other arthropod. In embodiments, the non-animal-based food product simulates a whole cut of animal meat derived from skeletal muscle. In additional embodiments, the non-animal-based food product may simulate animal meat from an organ such as a kidney, heart, liver, gallbladder, intestine, stomach, bone marrow, brain, thymus, lung, tongue, among other organs. In still additional embodiments, the non-animal-based food product may simulate a primal cut, subprimal cut, secondary cut, retail cut, steak, fillet, breast, belly, thigh, leg, loin, tenderloin, rib, shoulder, chop, or jerky. In yet additional embodiments, the non-animal-based food product may simulate a boneless and/or skinless animal-based meat.

In further embodiments, the present non-animal-based food products may include levels of one or more nutrients or other ingredients so that their composition or characteristics more closely simulate those of a whole cut of an animal-based meat. In embodiments, the food product may have a moisture level of greater than or about 50 wt. %, greater than or about 55 wt. %, greater than or about 60 wt. %, greater than or about 65 wt. %, greater than or about 70 wt. %, greater than or about 75 wt. %, greater than or about 80 wt. %, or more. In more embodiments, the food product may have a moisture level of less than or about 50 wt. %, less than or about 45 wt. %, less than or about 40 wt. %, less than or about 35 wt. %, less than or about 30 wt. %, less than or about 25 wt. %, or less. In still more embodiments, the food product may be dehydrated, dried, or cured. In additional embodiments, the food product may have a weight percentage of protein greater than or about 5 wt. %, greater than or about 10 wt. %, greater than or about 15 wt. %, greater than or about 20 wt. %, greater than or about 25 wt. %, greater than or about 30 wt. %, greater than or about 40 wt. %, greater than or about 50 wt. %, or more. In yet additional embodiments, the food product may have a weight percentage of carbohydrates less than or about 20 wt. %, less than or about 15 wt. %, less than or about 10 wt. %, less than or about 5 wt. %, less than or about 2 wt. %, less than or about 1 wt. %, or less. In still further embodiments, the food product may have a weight percentage of lipids less than or about 50 wt. %, less than or about 40 wt. %, less than or about 30 wt. %, less than or about 25 wt. %, less than or about 20 wt. %, less than or about 15 wt. %, less than or about 10 wt. %, less than or about 9 wt. %, less than or about 8 wt. %, less than or about 7 wt. %, less than or about 6 wt. %, less than or about 5 wt. %, less than or about 4 wt. %, less than or about 3 wt. %, less than or about 2 wt. %, less than or about 1 wt. %, or less. In additional embodiments, the weight percentage of water, protein, carbohydrates, and/or lipids in the present non-animal-based food products may be within 50%, 40%, 30%, 20%, or 10% of the weight percentage found in an animal-based meat they are simulating.

In further embodiments where the non-animal-based food product simulates beef, pork, lamb, goat, or another kind of red-colored or pink-colored, animal-based meat, the food product may further include one or more iron-containing proteins. In embodiments, the iron-containing protein may include one or more proteins selected from androglobin, catalase, chlorocruorin, cyanoglobin, cytochrome, cytoglobin, erythrocruorin, flavohemoglobin, Glb3, globin E, globin X, globin Y, globin-coupled sensor, guanylate cyclase, Hell's gate globin I, HbN, HbO, hemoglobin, leghemoglobin, myoglobin, neuroglobin, non-symbiotic hemoglobin, oxidoreductase, peroxidase, protoglobin, truncated 2/2 globin, bacterial hemoglobin, ciliate myoglobin, and hemerythrin, among other iron-containing proteins. In some embodiments, the iron-containing protein is from a non-animal source, such as from a plant, algae, bacteria, fungus, ciliate, or genetically engineered organism. In more embodiments, the iron-containing protein is a recombinant protein. In additional embodiments, the iron-containing protein is a heme-containing protein or siroheme-containing protein. In yet additional embodiments, the iron-containing protein is a globin. In still additional embodiments, the iron-containing protein is an oxygen-binding protein or oxygen-transporting protein. In further embodiments, the iron-containing protein may account for a weight percentage of the food product that is less than or about 10 wt. %, less than or about 9 wt. %, less than or about 8 wt. %, less than or about 7 wt. %, less than or about 6 wt. %, less than or about 5 wt. %, less than or about 4 wt. %, less than or about 3 wt. %, less than or about 2 wt. %, less than or about 1 wt. %, or less. In further embodiments, the iron-containing protein may account for a weight percentage of the food product that is greater than or about 0.001 wt. %, greater than or about 0.005 wt. %, greater than or about 0.01 wt. %, greater than or about 0.05 wt. %, greater than or about 0.1 wt. %, greater than or about 0.15 wt. %, greater than or about 0.2 wt. %, greater than or about 0.3 wt. %, greater than or about 0.4 wt. %, greater than or about 0.5 wt. %, or more.

In further embodiments, the present non-animal-based food products may include one or more of sodium, potassium, calcium, magnesium, other metal ions or minerals, organic acids (e.g., acetic acid, ascorbic acid, citric acid, folic acid, fumaric acid, glycolic acid, lactic acid, malic acid, succinic acid, tartaric acid), free amino acids (e.g., cysteine, methionine, isoleucine, leucine, lysine, phenylalanine, threonine, tryptophan, valine, arginine, histidine, alanine, asparagine, aspartate, glutamate, glutamine, glycine, proline, serine, tyrosine, selenocysteine, citrulline, ornithine, beta-alanine, homoserine, non-proteinogenic amino acid, amino acid derivative), peptides (e.g., dipeptides, tripeptides, tetrapeptides, oligopeptides, polypeptides), sugars (e.g., monosaccharides, disaccharides, sucrose, glucose, fructose, maltose, ribose, arabinose, galactose, xylose, glucose 6-phosphate, fructose 6-phosphate, fructose 1,6-diphosphate, inositol, nucleotide-bound sugars, molasses), sugar alcohols (e.g., erythritol, glycerol, isomalt, lactitol, maltitol, mannitol, sorbitol, xylitol, hydrogenated starch hydrolysates), nucleotides (e.g., inosine, inosine monophosphate (IMP), guanosine, guanosine monophosphate (GMP), adenosine monophosphate (AMP)), provitamins, vitamins (e.g., A, B, C, D, E, K), antioxidants, antimicrobials, preservatives, hydrolysates (e.g., vegetable protein hydrolysate, soy protein hydrolysate, yeast protein hydrolysate, algal protein hydrolysate), yeast extracts, metabolites, natural flavors, natural pigments, dietary fiber (e.g., soluble fiber, insoluble fiber), emulsifiers, stabilizers, thickeners, and sulfur compounds (e.g., cysteine, acetyl cysteine, cystine, taurine, thiamine, methionine, glutathione, alliin, biotin). In additional embodiments, the concentration of sodium, potassium, calcium, magnesium, other metal ions or minerals, organic acids, free amino acids, peptides, sugars, sugar alcohols, nucleotides, provitamins, vitamins, antioxidants, metabolites, natural flavors, natural pigments, and/or sulfur compounds in the present non-animal-based food products may be within about 50%, about 40%, about 30%, about 20%, or about 10% of the concentrations found in an animal-based meat they are simulating.

In still further embodiments, examples of the non-animal-based food products may have the following characteristics:

| Wet tensile | | |
|---|---|---|
| | Strength | Elongation at break |
| Fiber, Cooked | 0.003 to 0.28 cN/(dry g/1000 m) or cN/tex | 19 to 205% |
| Membrane scaffolding, along the grain | 0.005 to 0.01 MPa | 15 to 40% |
| Membrane scaffolding, against the grain | 0.001 to 0.004 MPa | 10 to 26% |

| Compression | | | | | |
|---|---|---|---|---|---|
| | Maximum Force | Spinginess | Resilience | Cohesivness | Chewiness |
| Fiber, Cooked | 3.5 to 125 g/mm² | 7 to 75% | 0 to 15% | 0 to 60% | 3 to 1500 kg |
| Membrane scaffolding | 1 to 95 g/mm² | 15% to 90% | 3% to 50% | 20% to 90% | 0.15 to 45 |

| Kramer, Shear resistance | | |
|---|---|---|
| | Linear force against the grain (N/mm) | Linear force long the grain (N/mm) |
| Fiber | 0.25 to 26 N/mm | 0.05 to 3.6 N/mm |
| Membrane scaffolding | 2.5 to 4 N/mm | 1.2 to 3.5 N/mm | pH: 5.2 to 8.5

Another benefit of the present technology over traditional animal-based meat products and conventional vegetable substitutes for animal-based meat products is the exclusion of one or more ingredients that may be responsible for food allergies or other ailments. In embodiments, the present non-animal-based food products may be free of one or more ingredients selected from gluten (e.g., wheat gluten), wheat-derived allergens, peanut-derived allergens, tree-nut-derived allergens, milk-derived allergens, egg-derived allergens, shellfish-derived allergens, fish-derived allergens, soy-derived allergens, sesame-derived allergens, caramel coloring, artificial coloring, artificial flavors, artificial sweeteners, high-fructose corn syrup, sugar alcohols, cholesterol, trans fats, hydrogenated oils, nitrites, and nitrates, among other ingredients. In further embodiments, the present non-animal-based food products may be free of iron-containing protein from an animal source. In still further embodiments, the present non-animal-based food products may be free of animal products.

Embodiments of the present technology further include methods of making a cooked, non-animal-based food product that simulates a cooked whole cut of meat from an animal. The methods may include providing a raw food product to a cooking apparatus. The raw food product may be a non-animal-based food product. In embodiments, the raw-food product may include a fiber-containing non-animal-based food product or a membrane-scaffolding-containing non-animal-based food product like those described above. In additional embodiments the cooking apparatus may be a conventional oven, a convection oven, a microwave oven, a stovetop range, a hotplate, a fryer, an air fryer, a pressure cooker, a slow cooker, a water bath, a steamer, or a grill, among other kinds of cooking apparatus.

The method may further include heating the raw food product with the cooking apparatus to make the cooked food product. In embodiments, the cooked food product may be characterized by a reduction in the volume of greater than or about 10 vol. % compared to the raw food product. In additional embodiments, the cooked food product may be characterized by a volume reduction of greater than or about 12.5 vol. %, greater than or about 15 vol. %, greater than or about 17.5 vol. %, greater than or about 20 vol. %, greater than or about 25 vol. %, greater than or about 30 vol. %, or more. In yet additional embodiments, the reduction in volume of the cooked food product may be caused at least in part by a release of water vapor from the food product. In further embodiments, the raw food product may be heated to a temperature of greater than or about 145° F., greater than or about 150° F., greater than or about 155° F., greater than or about 160° F., greater than or about 165° F., greater than or about 170° F., greater than or about 175° F., greater than or about 180° F., greater than or about 185° F., greater than or about 190° F., greater than or about 195° F., greater than or about 200° F., or more.

In embodiments, heating the raw food product to a cooking temperature may cause one or more physical and chemical changes to the food product. In additional embodiments, the heating may cause one or more types of fibers or membranes in the raw food product to melt or dissolve. In further embodiments, melting or dissolving the fibers or membranes may release at least one of liquids and gases from the food product that characterize a cooked food product. In more embodiments, the reduction in volume of the cooked food product may be caused at least in part by the released liquids and gases from the melted or dissolved fibers or membranes.

In further embodiments, heating the raw food product may redistribute the lipid concentration in the food product. In embodiments, more of the lipids in the raw food product may migrate towards the cooked surfaces of the food product. In further embodiments, the weight percentage of lipids in one or more surface layers of the cooked food product may have increased to greater than or about 10 wt. %, greater than or about 15 wt. %, greater than or about 20 wt. %, greater than or about 25 wt. %, greater than or about 30 wt. %, greater than or about 35 wt. %, greater than or about 40 wt. %, greater than or about 45 wt. %, greater than or about 50 wt. %, or more. The increased weight percentage of hydrophobic lipids in the surface layers of the cooked food product may help the food product to retain moisture inside the product to give it a juicy appearance and mouthfeel, among other organoleptic properties.

In embodiments, heating the raw food product to make the cooked food product may bring about a variety of additional changes in the organoleptic properties of the food product, including one or more of color, odor, chewiness, and shear properties, among other organoleptic properties. In additional embodiments that include the present non-animal-based food products simulating red meat, the raw food product may have a red color that gradually transitions to a brown color during cooking. In further embodiments that include the present non-animal-based food products simulating white meat such as chicken or pork, the raw food product may have a pink color that gradually transitions to a white or brownish color during cooking. In more embodiments, the color transition may be used to indicate the cooking progression of the raw food product and further used to titrate the cooking time and temperature to produce a desired state of done-ness.

In additional embodiments, the heating of the raw food product may cause the release of odorants that indicate the food product is being cooked. In further embodiments, the odorants released by the food product may include odorants recognizable by humans as indicative of the cooking of animal-based meats such as beef, pork, bacon, chicken, lamb, fish, shellfish, and turkey, among other animal-based meats. In yet further embodiments, the odorants may be generated from one or more compounds in the raw food product such as fats, protein, amino acids, peptides, nucleotides, organic acids, sulfur compounds, and sugars, among other compounds. In some embodiments, these compounds are released intact from the raw food product due to the increase in temperature. In additional embodiments, these compounds undergo a chemical transformation or reaction in the food product due to the increase in temperature, and the chemically transformed or reacted compound is released from the food product. In still more embodiments, the raw food product may include an iron-containing protein (e.g., a heme protein), and one or more odorants released from the food product during heating may be catalyzed by at least one iron-containing protein such as myoglobin and leghemoglobin. In these embodiments, at least part of the characteristic flavor and fragrance of the cooked food product are produced during the heating of the raw food product by chemical reactions catalyzed by iron-containing proteins such as heme proteins.

In further embodiments, the heating may increase the chewiness of the cooked food product compared to the raw food product. In additional embodiments, chewiness may be measured as the amount of force needed to chew the food product. For whole cuts of many animal-based food products such as red meats, cooking the meat increases its chewiness, and consumers expect the same transition in non-animal-based food products that simulate read meats. In embodiments of the present non-animal-based food products, heating the raw food product to make a cooked food product may increase the chewiness of the cooked food product compared to the raw food product by greater than or about 10%, greater than or about 15%, greater than or about 20%, greater than or about 25%, greater than or about 30%, greater than or about 35%, greater than or about 40%, greater than or about 45%, greater than or about 50%, or more.

In still further embodiments, the heating may change the shear properties of the cooked food product compared to the raw food product. In additional embodiments, the shear properties may include the cutting force needed to cut through the food product. For whole cuts of many animal-based food products, cooking the meat increases the shear force needed to cut the meat, and consumers expect the same transition in non-animal-based food products that simulate animal-based meats. In embodiments of the present non-animal-based food products, heating the raw food product to make a cooked food product may increase a shear force of the cooked food product compared to the raw food product by greater than or about 10%, greater than or about 15%, greater than or about 20%, greater than or about 25%, greater than or about 30%, greater than or about 35%, greater than or about 40%, greater than or about 45%, greater than or about 50%, or more.

Embodiments of the present technology further include methods and systems of making non-animal-based food products. In embodiments, the methods may include making non-animal-based food fibers that are incorporated into the food products. In additional embodiments, the methods of making the non-animal-based food fibers may include operations such as providing a raw material from which the fibers are made. In more embodiments, the methods may include forming the raw material into nascent fibers. The still more embodiments, the methods may include hardening the nascent fibers into hardened fibers. In yet further embodiments, the methods may include neutralizing the hardened fibers into neutralized fibers. In additional embodiments, the methods may include washing and drying the neutralized fibers to form dried fibers. In yet further embodiments, the methods may include coloring, flavoring, and oiling the dried fibers. In more embodiments, the methods may include packaging the fibers or directly incorporating the fibers into the fiber-containing food product.

Figure 4:
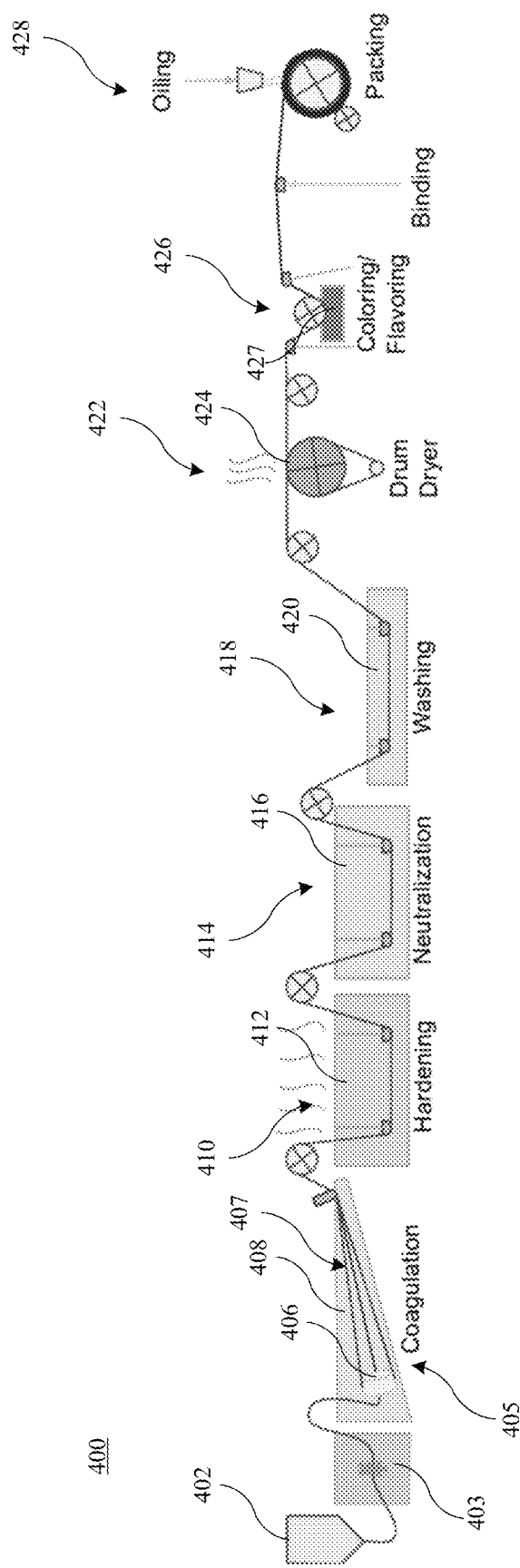
FIG. 4 shows a simplified schematic of a system for making fibers for non-animal-based food products according to embodiments.

FIG. 4 shows a simplified schematic of a system 400 for making the fibers included in fiber-containing, non-animal-based food products according to embodiments of the present technology. The system 400 includes a supply 402 of the raw material to form the fibers. In embodiments, the raw material may be sonicated, degassed, homogenized, and/or mixed under high shear. In more embodiments, the supply 402 of material may be coupled to a pump 403 that supplies the material under pressure to fiber-forming die unit 405. In further embodiments, the fiber forming die unit 405 may include at least one spinneret 406 that forms the material into one or more nascent fibers 407.

In embodiments, the nascent fibers 407 may contact a first coagulation bath 408 following their formation by the spinneret 406. In additional embodiments, the aqueous coagulation bath 408 may include one or more salts, bases, and/or acids dissolved in water that coagulate the materials in the nascent fibers 407 to convert them into coagulated fibers. In yet additional embodiments, the coagulation bath 408 may use pH shift, salting out, and/or heat to denature, precipitate, and/or coagulate the materials in the nascent fibers 407 and convert them into coagulated fibers. In further embodiments, the coagulation bath 408 may be characterized by a pH of less than or about 5, less than or about 4, less than or about 3, less than or about 2, less than or about 1, or less. In additional embodiments, the coagulation bath may be characterized by a salt concentration of greater than or about 2.5 wt. %, greater than or about 5 wt. %, greater than or about 7.5 wt. %, greater than or about 10 wt. %, greater than or about 12.5 wt. %, greater than or about 15 wt. %, greater than or about 17.5 wt. %, greater than or about 20 wt. %, or more. In more embodiments, contacting the nascent fibers 407 with the coagulation bath 408 may decrease the pH of the materials in the fibers compared to the nascent fibers 407 emerging from the spinneret 406.

In additional embodiments, the coagulated fibers may be pulled from the fiber forming die unit 405 to a hardening unit 410 where the coagulated fibers are contacted with a hardening bath 412 to form hardened fibers. In embodiments, the hardening bath 412 may be characterized by a pH that is comparable to or higher than the pH of the first coagulation bath 408. In more embodiments, the hardening bath 412 may be heated. In additional embodiments, the hardening bath 412 may be characterized by a temperature of greater than or about 30° C., greater than or about 35° C., greater than or about 40° C., greater than or about 45° C., greater than or about 50° C., greater than or about 55° C., greater than or about 60° C., greater than or about 65° C., greater than or about 70° C., greater than or about 75° C., greater than or about 80° C., greater than or about 85° C., greater than or about 90° C., greater than or about 95° C., or more.

In further embodiments, the hardened fibers emerging from the hardening unit 410 may be pulled to a neutralization unit 414, where the fibers are contacted with a neutralization bath 416. In still further embodiments, the neutralization bath 416 may be characterized by a pH between about 5 to about 9, about 6 to about 8, or about 6 to about 7. In further embodiments, the neutralization bath 416 may include one or more phosphate compounds to maintain a buffering capacity in the bath. In yet further embodiments, the neutralization bath 416 may be characterized by a phosphate compound concentration of greater than or about 0.02 M, greater than or about 0.05 M, greater than or about 0.075 M, greater than or about 0.1 M, greater than or about 0.125 M, greater than or about 0.15 M, greater than or about 0.175 M, greater than or about 0.2 M, or more. In additional embodiments, the neutralization bath 416 may be characterized by a temperature of greater than or about 30° C., greater than or about 35° C., greater than or about 40° C., greater than or about 45° C., greater than or about 50° C., greater than or about 55° C., greater than or about 60° C., greater than or about 65° C., greater than or about 70° C., greater than or about 75° C., greater than or about 80° C., greater than or about 85° C., greater than or about 90° C., greater than or about 95° C., or more.

In more embodiments, the hardened and neutralized fibers may be pulled through one or more washing units 418, where the fibers are contacted with a washing bath 420 that extracts residual salts and/or compounds from previous processing operations. In still more embodiments, the coagulated fibers may be directly pulled from the coagulation bath 408 through one or more washing units 418. In more embodiments, the water used in the washing bath 420 may be filtered tap water.

In yet more embodiments, the washed fibers may be transferred to a drying unit 422 that reduces the moisture content of the fibers. In embodiments, the washed fibers may be stretched to ring out a portion of the water in the fiber and transferred to drying drums 424 that evaporate additional moisture from the fibers. In more embodiments, the stretching operation may place a tensile stress on the fibers of greater than or about 0.02 N/mm, greater than or about 0.05 N/mm, greater than or about 0.1 N/mm, greater than or about 0.15 N/mm, greater than or about 0.2 N/mm, or more. In further embodiments, the stretching of the fiber may increase the fiber length by greater than or about 10%, greater than or about 20%, or more. In additional embodiments, the drying unit 422 may include drying drums 424 that increase the temperature of the fiber in a low-humidity environment. In additional embodiments, the drying drums 424 may be characterized by a temperature of greater than or about 50° C., greater than or about 60° C., greater than or about 70° C., greater than or about 80° C., greater than or about 90° C., greater than or about 100° C., greater than or about 110° C., greater than or about 120° C., greater than or about 130° C., greater than or about 140° C., or more. In still further embodiments, the fibers may be stretched and squeezed on the drying drums 424 to ring additional moisture out of the fibers. In more embodiments, the drying operation in the drying unit 422 may reduce the moisture content in the fibers by greater than or about 5%, greater than or about 10%, greater than or about 15%, greater than or about 15%, or more. In still more embodiments, the dried fiber may be characterized by a moisture content of less than or about 70 wt. %, less than or about 65 wt. %, or less.

In still more embodiments, the dried fibers may be colored, flavored, and/or oiled by being pulled through a coloring/flavoring unit 426 and/or contacted with an oiling unit 428. In embodiments, the coloring/favoring unit 426 may include one or more coloring/flavoring baths 427 that provide one or both of color and flavor to the fibers as they contact the baths. In additional embodiments, the colored, flavored, and/or oiled, fibers may be bound together using a binding agent and incorporated into fiber-containing, non-animal-based food products. In still further embodiments, the colored, flavored, and/or oiled, fibers may be packaged for later incorporation into fiber-containing, non-animal-based food products.

In more embodiments, the fibers have a tensile strength of 0.2-0.9 MPa. In still more embodiments, the fibers have a % elongation at break of between 20-100%, 40-90%, or 30-75%. In additional embodiments, the fibers have a tenacity of 0.005-0.025, 0.01-0.02, or 0.012-0.016 cN/tex. In embodiments, the fibers have a linear density of 60-150 tex.

In additional embodiments of the present technology, the methods may include making non-animal-based food scaffolding that is incorporated into the food products. In further embodiments, the methods of making the non-animal-based food scaffolding may include operations such as providing a raw material from which the food scaffolding is made. In more embodiments, the methods may include pouring the aqueous solutions or slurries of the raw material into molds. In still more embodiments, the methods may include cooling or freezing the raw material in the molds. In yet additional embodiments, the methods may include freeze drying the frozen molds to remove at least a portion of the water from the molded materials. In still further embodiments, the methods may include steaming the freeze-dried molded material. In more embodiments, the methods may include soaking the steamed molded material in a soaking solution. In yet more embodiments, the methods may include setting the soaked, molded material to form the food scaffolding. In further embodiments, the method may include finishing operations on the food scaffolding to form the non-animal-based-food product and packaging the food product.

Figure 5:
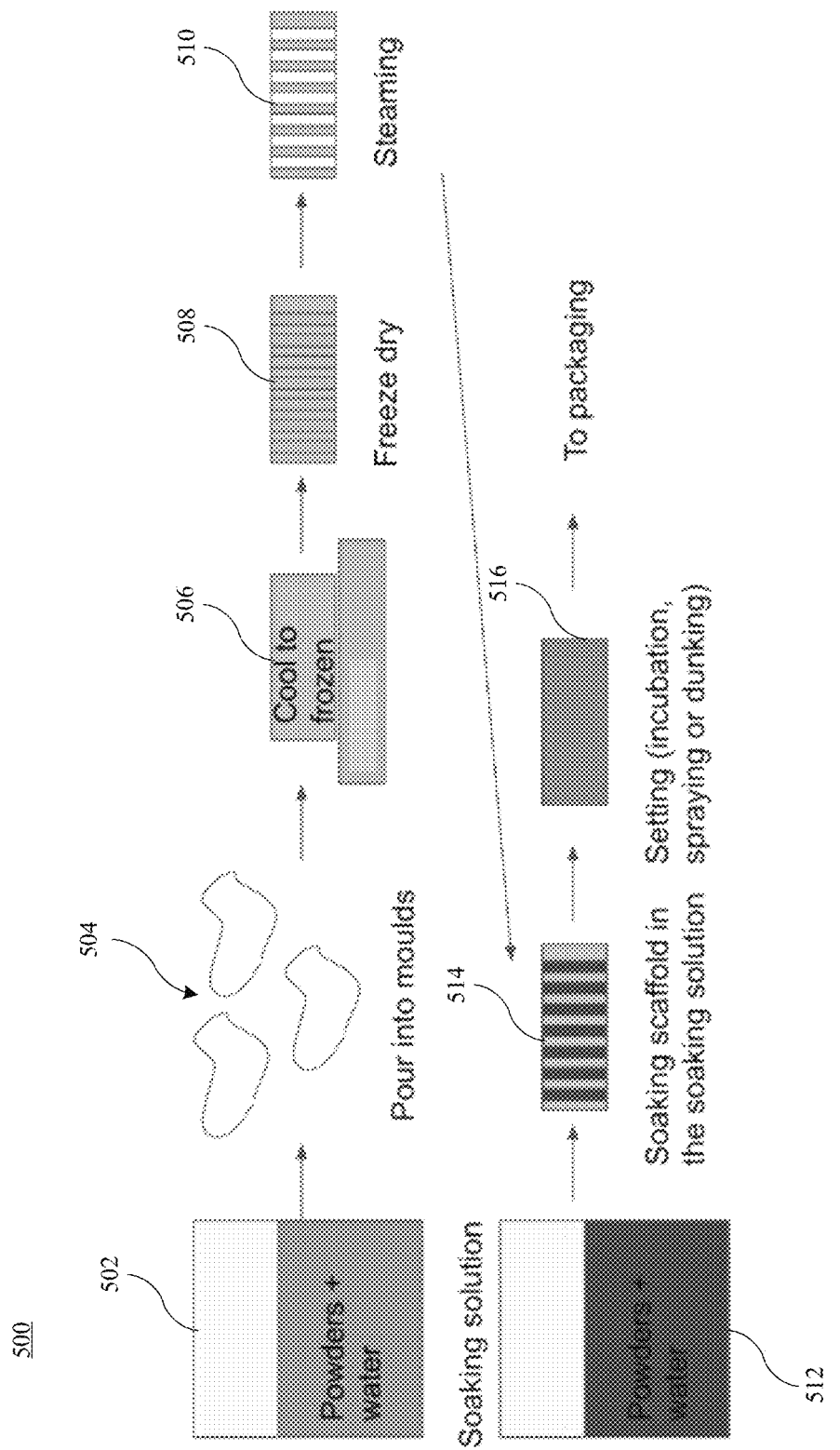
FIG. 5 shows a simplified schematic of a system for making a food scaffolding for non-animal-based food products according to embodiments.

FIG. 5 shows a simplified schematic of a system 500 for making a food scaffolding included in some of the non-animal-based food products according to embodiments of the present technology. The system 500 includes a supply 502 of the raw material to form the food scaffolding. In embodiments, the supply 502 may include the non-animal-based proteins, carbohydrates, and lipids that are incorporated into the food scaffolding in addition to water. In further embodiments, the supply 502 may include protein particles characterized by a D50 particle size of less than or about 100 μm, less than or about 75 μm, less than or about 50 μm, less than or about 25 μm, less than or about 10 μm, less than or about 5 μm, less than or about 1 μm, less than or about 0.1 μm, or less. In more embodiments, the raw material may be sonicated, degassed, homogenized, and/or mixed under high shear. In further embodiments, the aqueous solution, mixture, or slurry of the raw materials may be poured into molds 504 that provide a shape to the scaffolding. In more embodiments, the molds may be shaped to mimic the shape, texture, and other characteristics of a whole-cut meat product. In still more characteristics, the mold may be shaped to enable anisotropic heat flow in the mold that freezes the raw material with a particular ice crystal orientation, shape, and size, among other characteristics of the ice crystals.

In embodiments, the molds 504 containing the raw materials may be placed in a cooling unit 506 that cools the molded raw materials to a temperature of less than or about 0° C., less than or about −5° C., less than or about −10° C., less than or about −15° C., less than or about −20° C., less than or about −40° C., less than or about −60° C., less than or about −80° C., less than or about −196° C., or less. In further embodiments, the molded raw materials may be placed in the cooling unit 506 until the water in the materials freezes. In more embodiments, the freezing is directional, for example, from a single side of the mold.

In additional embodiments, the molded, frozen raw material may be placed in a freeze drying unit 508 to freeze dry the molded material. In further embodiments, the freeze drying of the molded material removes at least a portion of the water from the material to form a freeze-dried molded material. In more embodiments, greater than or about 80%, greater than or about 85%, greater than or about 90%, greater than or about 95%, greater than or about 98%, greater than or about 99%, or more, of the water is removed from the material.

In further embodiments, the freeze-dried molded material may be placed in a steaming unit 510 to steam the freeze-dried molded material. The steaming operation introduces some water back into the molded material while leaving interstitial spaces in the molded material for the incorporation of a soaking solution. In additional embodiments, steaming can be performed at reduced pressure. In yet additional embodiments, steaming can be performed at a temperature at or above the denaturation or gelation temperature of a component of the raw material, for example, a non-animal-based protein. In still further embodiments, the molded material may be characterized by a moisture content of greater than or about 3 wt. %, greater than or about 5 wt. %, greater than or about 8 wt. %, greater than or about 10 wt. %, greater than or about 15 wt. %, greater than or about 20 wt. %, greater than or about 25 wt. %, greater than or about 30 wt. %, or more, after being placed in the steaming unit 510.

In more embodiments, a soaking solution 512 may be added to the steamed molded material. In embodiments the soaking solution may include an aqueous solution, mixture, or slurry of additional materials, for example, a gelling agent, an iron-containing protein, and/or flavoring agents, that are incorporated into the non-animal-based food product. In further embodiments, the soaking solution is incorporated into the steam molded material to form an unset form of the scaffolding-containing food product 514. In more embodiments, the soaking solution is incorporated under vacuum. In yet more embodiments, the unset product may be set to form the scaffolding-containing food product 516. In embodiments, the setting operations may include heating, incubating, spraying, injecting, or dunking the unset product to form the set product. In further embodiments, the setting operation may include enzymatic crosslinking, chemical crosslinking, and/or thermal crosslinking in the scaffolding-containing food product 516. In additional embodiments, the scaffolding-containing food product 516 may undergo final processing and packaging.

EXPERIMENTAL

Figure 6A:
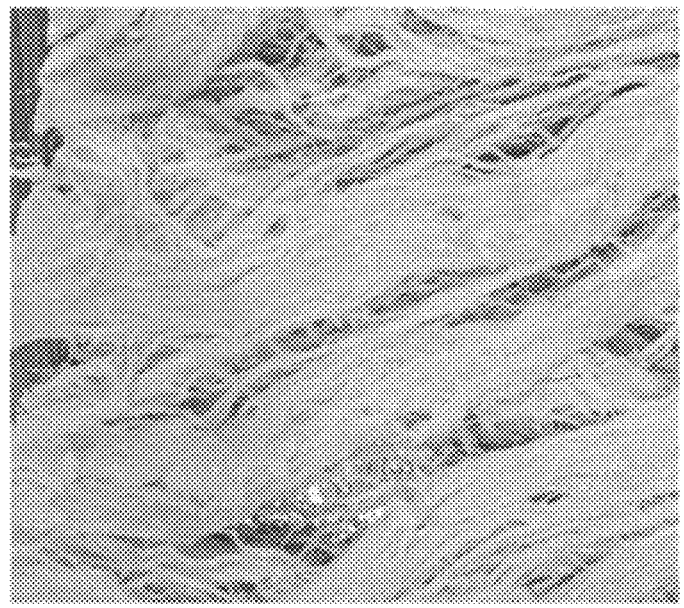
FIG. 6A shows a picture of a fiber-containing non-animal-based substrate according to embodiments.

FIG. 6A shows a picture of a non-animal-based fiber substrate that was used to make an embodiment of the present fiber-containing, non-animal-based food products. The fiber substrate was made from a protein slurry that included water and non-animal-based (i.e., plant-based) proteins. The protein slurry was spun into fibers that were arranged into the fiber substrate.

Figure 6B:
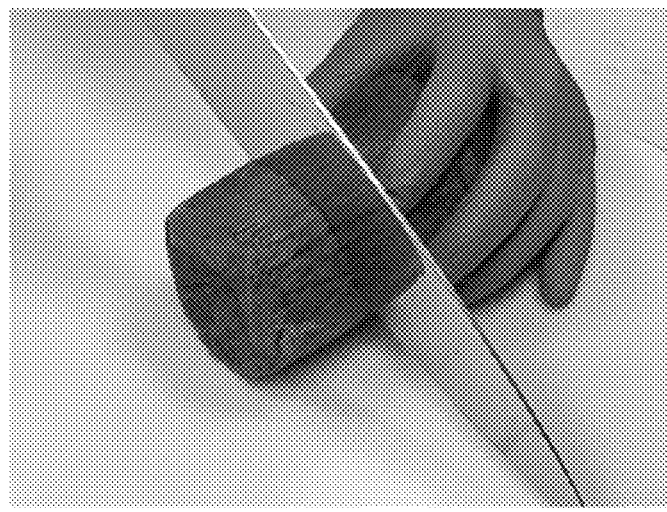
FIG. 6B shows a picture of a non-animal-based food product simulating red meat according to embodiments.

FIG. 6B shows a picture of the non-animal-based, fiber-containing food product simulating a whole cut of raw tenderloin being cut into filet mignon. The food product was made from the fiber substrate shown in FIG. 6A combined with additional ingredients, including flavoring agents, iron-containing proteins, and lipids to simulate filet mignon.

Figure 7A:
FIG. 7A shows a picture of a non-animal-based scaffolding according to embodiments.

FIG. 7A shows a picture of a non-animal-based scaffolding that was used to make another embodiment of the present fiber-containing, non-animal-based food products. The scaffolding was made from a freeze aligned mixture of soy protein and polysaccharide.

Figure 7B:
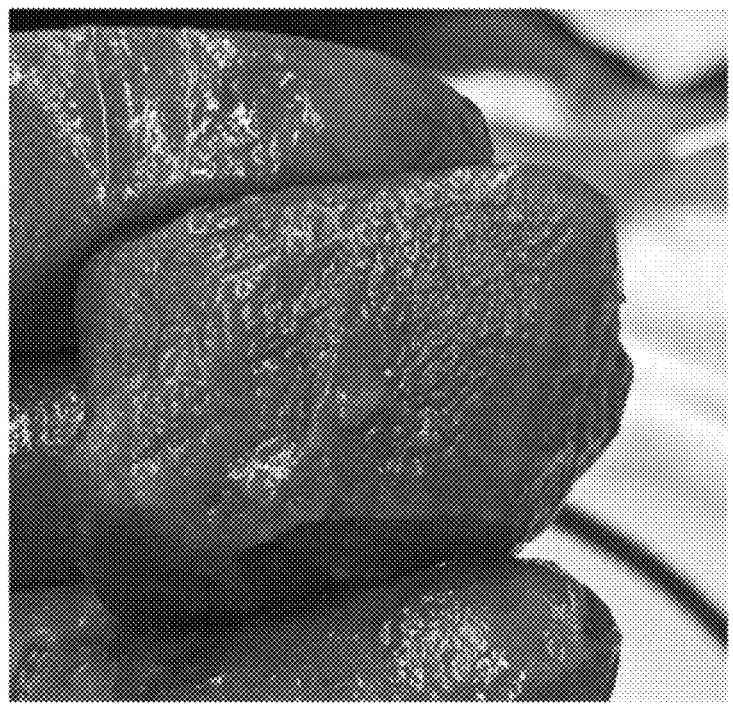
FIG. 7B shows a picture of non-animal-based food product simulating red meat according to embodiments.

FIG. 7B shows a picture of the non-animal-based, scaffolding-containing food product simulating a whole cut of red meat. The non-animal-based scaffolding shown in FIG. 7A was infused with a gelling agent that included flavoring agents and non-animal-based lipids. The final food product included 22 wt. % non-animal-based protein, 7 wt. % fat and 70 wt. % water.

The food products shown in FIGS. 6B and 7B were compared favorably to the animal-based meats they were attempting to simulate. They demonstrate that non-animal-based food products can be made that are good simulations of animal-based meats. They also have the added benefits of being made from non-animal-based food ingredients that do not have the environmental and ethical challenges associate with animal-based meats.

FIGS. 8A and 8B show scanning electron microscope (SEM) images at different magnifications of a cross-sectional cut in substantially round shaped fibers of a non-animal-based food product. In the embodiments shown, the fibers include about 16 wt. % protein and 3 wt. % gluten. FIG. 8A shows the cross-sectional cut of the fibers at a 690× magnification while FIG. 8B shows the cross-sectional cut of the fibers at 3000× magnification. FIGS. 8A and 8B show the cross-section of the fibers are substantially circular with an average fiber diameter of about 30 µm, an average cross-sectional fiber density of greater than or about 1000 fibers/mm², and an average aspect ratio of about 5 to 1.

FIGS. 9A and 9B show scanning electron microscope (SEM) images at different magnifications of a cross-sectional cut in substantially flattened fibers of a non-animal-based food product. In the embodiments shown, the fibers include about 16 wt. % protein and 3 wt. % gluten. FIG. 9A shows the cross-sectional cut of the fibers at a 690× magnification while FIG. 9B shows the cross-sectional cut of the fibers at 3000× magnification. FIGS. 9A and 9B show the cross-section of the fibers are substantially ribbon-shaped with an average long axis of about 50 µm, and an average short axis of about 15 µm. The ribbon-shaped fibers have an average cross-sectional fiber density of greater than or about 500 fibers/mm², and an average aspect ratio of about 6 to 1.

FIGS. 10A and 10B show scanning electron microscope (SEM) images at about ×1100 magnification of a cross-sectional cut in a non-animal-based food product that includes a food scaffolding. FIGS. 10A and 10B show the cross-section of a food scaffolding that includes a number of crosslinked sheets.

Figure 11A:
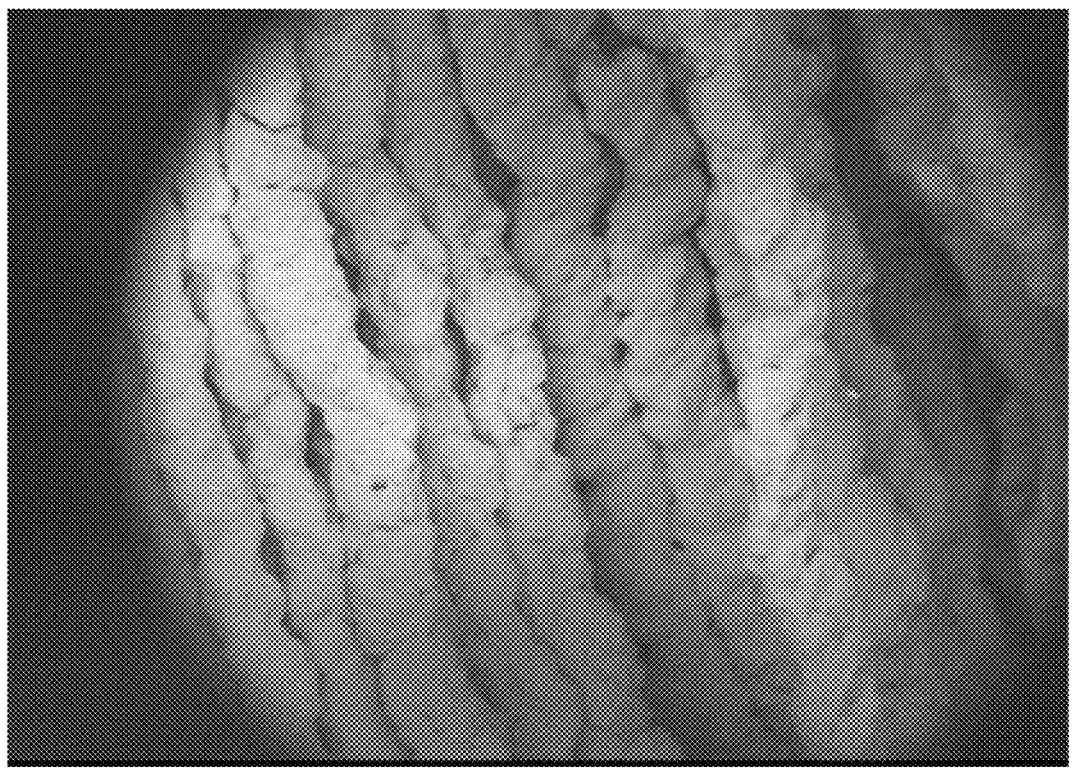
FIG. 11A shows an SEM image of a non-animal-based food product including irregular-surface fibers according to embodiments.
Figure 11B:
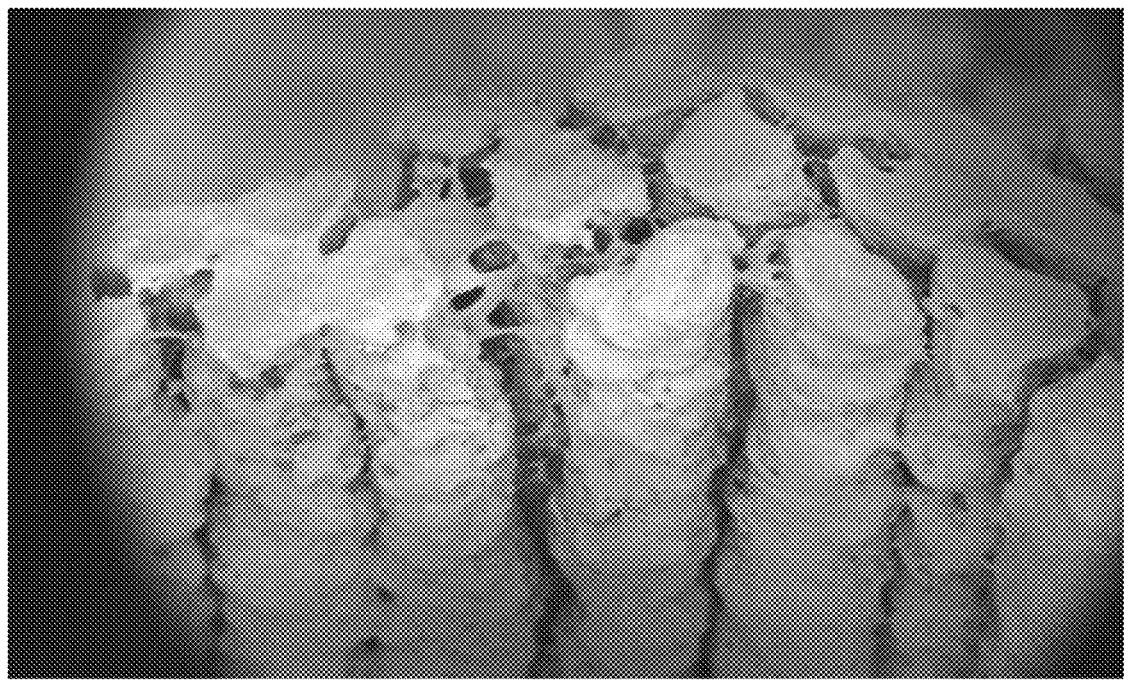
FIG. 11B shows another SEM image of a non-animal-based food product including irregular-surface fibers with interconnecting webs according to embodiments.

FIGS. 11A and 11B show scanning electron microscope (SEM) images of irregularly-shaped fibers of a non-animal-based food product. FIG. 11A shows a group of the fibers at 200× magnification. The fibers have a substantially parallel alignment and an average fiber diameter of about 150 µm. FIG. 11B shows the fibers after being exposed to water vapor (i.e., steaming) for about 45 minutes. Steaming the fibers created greater interconnectivity between adjacent fibers. The increased interconnectivity in the steamed fibers increased the toughness and reduced the tenderness of the non-animal-based food product.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a fiber" includes a plurality of such fibers, and reference to "the non-animal-based protein" includes reference to one or more non-animal-based proteins and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

The invention claimed is:

1. A non-animal-based food product, the food product comprising:
   a group of aligned fibers, wherein the fibers have an average fiber diameter between about 50 µm and about 500 µm, wherein the fibers comprise a non-animal-based protein, and wherein the fibers are characterized by a Kramer shear resistance of 0.25 N/mm to 26 N/mm as measured against the grain;
   at least one binding agent in an interstitial space between at least a portion of the group of aligned fibers, wherein the at least one binding agent is present in an amount of 20 wt. % or less of the food product.

2. The food product of claim 1, wherein the food product comprises an additional group of fibers comprising at least one non-animal-based protein and at least one polysaccharide, wherein the additional group of fibers envelops the group of aligned fibers into a fiber bundle.

3. The food product of claim 2, wherein the at least one polysaccharide is selected from the group consisting of an alginate, konjac, gellan, carrageenan, locust bean gum, pectin, and an alkylcellulose.

4. The food product of claim 1, wherein the food product comprises an additional group of structures comprising at least one non-animal-based protein and at least one non-animal-based lipid, wherein the additional group of structures are non-uniformly distributed in the food product.

5. The food product of claim 4, wherein the at least one non-animal-based lipid is selected from the group consisting of sunflower oil and coconut oil.

6. The food product of claim 1, wherein the non-animal-based protein in the group of fibers includes at least one protein selected from the group consisting of soy protein, pea protein, potato protein, seitan protein, lentil protein, bean protein, amaranth protein, and *quinoa* protein.

7. The food product of claim 1, wherein the food product further comprises at least one iron-containing protein.

8. The food product of claim 1, wherein the food product is characterized by a Kramer shear resistance as measured across the longitudinal direction of the fibers that is greater than or twice a Kramer shear resistance as measured along the longitudinal direction of the fibers when the food product is heated to an internal temperature of 145° F. or greater.

9. The food product of claim 1, wherein the fibers are characterized by a Kramer shear resistance of 0.05 N/mm to 3.6 N/mm as measured along the grain.

10. The food product of claim 1, wherein the fibers are characterized by a tensile strength of 0.2 MPa to 0.9 MPa.

11. The food product of claim 1, wherein the fibers have an elongation at break of 30 percent to 75 percent.

12. The food product of claim 1, wherein the fibers have a tenacity of 0.005 to 0.025 cN/tex.

13. The food product of claim 1, wherein the fibers have a linear density of 60-150 tex.

14. The food product of claim 1, wherein the group of aligned fibers extends from a first end of the food product to a second end of the food product.

15. The food product of claim 14, wherein the fibers in the group of aligned fibers have an average length of at least about 10 mm.

16. The food product of claim 1, wherein the group of aligned fibers comprises at least about 50 fibers.

17. The food product of claim 16, wherein the group of aligned fibers has an average cross-section diameter of at least about 1 mm.

18. The food product of claim 1, wherein the food product is free of animal products.

19. The food product of claim 1, wherein a dry weight of protein in the group of aligned fibers is at least about 15 wt. %.

20. The food product of claim 1, wherein the fibers in the group of aligned fibers are substantially parallel to each other.

21. A non-animal-based food product, the food product comprising:
a scaffolding having one or more membranes that have a three-dimensional porous structure, wherein the scaffolding comprises one or more non-animal-based proteins; and
a gelling agent filling one or more pores in the scaffolding, wherein the gelling agent comprises water, at least one non-animal-based protein, and at least one non-animal-based polysaccharide, and wherein the gelling agent is present in an amount of greater than 20 wt. % of the food product,
wherein the scaffolding is characterized by a Kramer shear resistance of 2.5 N/mm to 4.0 N/mm as measured against the grain and a Kramer shear resistance of 1.2 N/mm to 3.5 N/mm as measured along the grain.

22. The food product of claim 21, wherein the one or more membranes of the scaffolding comprise a first group of membranes aligned in a first direction and a second group of crosslinking membranes that connect with the first group of membranes.

23. The food product of claim 21, wherein the one or more non-animal-based proteins in the scaffolding includes at least one protein selected from the group consisting of soy protein, pea protein, potato protein, seitan protein, lentil protein, bean protein, amaranth protein, and *quinoa* protein.

24. The food product of claim 21, wherein the at least one non-animal-based polysaccharide in the gelling agent includes at least one polysaccharide selected from the group consisting of an alginate, konjac, gellan, carrageenan, locust bean gum, pectin, and an alkylcellulose.

25. The food product of claim 21, wherein the gelling agent further comprises at least one additional compound selected from the group consisting of an enzymatic cross-linker, an emulsifier, an iron-containing protein, and a non-animal-based lipid.

* * * * *